(12) United States Patent
Whitehead et al.

(10) Patent No.: US 11,648,734 B2
(45) Date of Patent: May 16, 2023

(54) INVERTED LASER SINTERING SYSTEMS FOR FABRICATION OF ADDITIVELY-MANUFACTURED PARTS

(71) Applicant: The Trustees of Columbia University in the City of New York, New York, NY (US)

(72) Inventors: John Whitehead, New York, NY (US); Hod Lipson, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 32 days.

(21) Appl. No.: 16/784,729

(22) Filed: Feb. 7, 2020

(65) Prior Publication Data

US 2020/0254688 A1 Aug. 13, 2020

Related U.S. Application Data

(60) Provisional application No. 62/945,768, filed on Dec. 9, 2019, provisional application No. 62/802,744, filed on Feb. 8, 2019.

(51) Int. Cl.
*B29C 64/268* (2017.01)
*B29C 64/153* (2017.01)
(Continued)

(52) U.S. Cl.
CPC ............ *B29C 64/268* (2017.08); *B22F 12/00* (2021.01); *B29C 64/153* (2017.08); *B33Y 10/00* (2014.12); *B33Y 30/00* (2014.12); *B22F 10/10* (2021.01)

(58) Field of Classification Search
CPC .................................................. B29C 64/268
See application file for complete search history.

(56) References Cited

U.S. PATENT DOCUMENTS 9,757,881 B2    9/2017 Tummala et al.
2016/0354840 A1 12/2016 Kulinsky et al.
(Continued)

OTHER PUBLICATIONS

"Aerosint Is Developing the First Commercial Multi-powder SLS 3D Printer," 3D Printing Media Network, Jan. 29, 2018. [Online]. https://www.3dprintingmedia.network/aerosint-multi-powder-SLS-3d-printer/.

(Continued)

*Primary Examiner* — Kelly M Gambetta
*Assistant Examiner* — Virak Nguon
(74) *Attorney, Agent, or Firm* — BakerHostetler

(57) ABSTRACT

Provided is an additive manufacturing process that uses an upward-pointing illumination source, such as a laser, projected through a substrate so as to solidify particulate matter supported by the substrate. The process is then repeated to build a hanging part layer by layer, for example by replenishing particulate matter on the substrate, or by moving the part a second substrate that supports other particulate matter. The disclosed process eliminates the need for a large powder bed and also allows for sintering of different powders in a single layer so as to give rise to parts that include layers that are themselves made from multiple materials. Also provided are related methods, include methods of incorporated cured resins into parts made by fusing particulate matter.

9 Claims, 25 Drawing Sheets
(16 of 25 Drawing Sheet(s) Filed in Color)

(51) Int. Cl.
| | |
|---|---|
| *B33Y 30/00* | (2015.01) |
| *B33Y 10/00* | (2015.01) |
| *B22F 12/00* | (2021.01) |
| *B22F 10/10* | (2021.01) |

(56) References Cited

U.S. PATENT DOCUMENTS

| | | | |
|---|---|---|---|
| 2017/0036403 | A1 | 2/2017 | Ruff et al. |
| 2017/0266882 | A1 | 9/2017 | Yan et al. |
| 2019/0039289 | A1 | 2/2019 | Owens et al. |
| 2020/0070417 | A1* | 3/2020 | Elsey ............... B29C 64/255 |

OTHER PUBLICATIONS

"The Complete Guide to Selective Laser Sintering (SLS) in 3D Printing," 3Dnatives, Dec. 11, 2017. [Online]. https://www.3dnatives.com/en/selective-laser-sintering100420174/.

"The State of 3D Printing," Sculpteo. [Online]. https://www.sculpteo.com/media/ebook/State of 3DP 2017_1.pdf.

Aerosint, "How multi-powder deposition will transform industrial 3D printing," Medium, Jan. 25, 2018.[Online]. https://medium.com/@aerosint/how-multi-powder-deposition-will-transform-industrial-3d printing fa7c83631091.

Y. Wang, et al., "Selective Laser Sintering Processing Behavior of Polyamide Powders," SPE ANTEC® Anaheim 2017.

A Dictionary of Earth Sciences, Oxford University Press, 2008, doi:10.1093/acref/9780199211944.001.0001.

Agarwala et al., "Direct selective laser sintering of metals", Rapid Prototyp. J., vol. 1, (1995), pp. 26-36.

Anderson et al., "Mechanical Properties of Specimens 3D Printed with Virgin and Recycled Polylactic Acid", 3D Print. Addit. Manuf., vol. 4, (2017), pp. 110-115.

Arai et al., "The development of cell-adhesive hydrogel for 3D printing", International Journal of Bioprinting, vol. 2, Issue 2, (Jun. 2016), pp. 153-162.

Bakshi et al., "A Review on Selective Laser Sintering: A Rapid Prototyping Technology", n.d. www.iosrjournals.org (accessed Apr. 23, 2019).

Bhushan et al., "An overview of additive manufacturing (3D printing) for microfabrication", Microsyst. Technol., vol. 23, (2017), pp. 1117-1124.

Cheng, "Resistance to Thermal Shock", J. Am. Rocket Soc., vol. 21, (1951), pp. 147-153.

Chivel et al., "New Approach to Multi-material Processing in Selective Laser Melting", Phys. Procedia., vol. 83, (2016), pp. 891-898.

Clark et al., "Microwave Measurements of Nylon-12 Powder Ageing for Additive Manufacturing, in: Solid Free", Fabr., 2017 Proc. 28th Annu. Int. , Solid Freeform Fabrication Symposium, 2017.

Dotchev et al., "Recycling of polyamide 12 based powders in the laser sintering process", Rapid Prototyp. J., vol. 15, (2009), pp. 192-203.

Drizo et al., "Environmental impacts of rapid prototyping: an overview of research to date", Rapid Prototyp. J., vol. 12, (2006), pp. 64-71.

Gornet et al., "Characterization of selective laser sintering materials to determine process stability", Sffsymposium. Engr. Utexas. Edu. (n.d.), undefined 2002, http://sffsymposium.engr.utexas.edu/Manuscripts/2002/2002-62-Gornet.pdf (accessed Apr. 23, 2019).

Grifith et al., "Laser engineered net shaping (LENS) for the fabrication of metallic components", 12. Annu. Meet. Jt. Work. Gr. (JOWOG-31), Livermore, CA (United States), May 13-16, 1996. (1996). https://digital.library.unt.edu/ark:/67531/metadc667090/ (accessed Jul. 17, 2019).

Guan et al., "Loose powder detection and surface characterization in selective laser sintering via optical coherence tomography", Proceedings Math. Phys. Eng. Sci., vol. 472, (2016), Feb. 1, 2016, doi:10.1098/rspa.2016.0201.

Haselhuhn et al., "In situ formation of substrate release mechanisms for gas metal arc weld metal 3-D printing", Journal of Materials Processing Technology, vol. 226, (Dec. 2015) pp. 50-59.

Jasveer et al., "Comparison of Different Types of 3D Printing Technologies", Int. J. Sci. Res. Publ., vol. 8, (2018).

Kaijima et al., "Functionally Graded Architectural Detailing Using Multi-Material Additive Manufacturing", 2017, http://papers.cumincad.org/data/works/att/caadria2017_142.pdf (accessed Jul. 3, 2019).

Kim et al., "Slice overlap-detection algorithm for process planning in multiple-material stereolithography", Int. J. Adv. Manuf. Technol., vol. 46, (2010), pp. 1161-1170.

Kruth et al., "Lasers and materials in selective laser sintering", Assem. Autom., vol. 23, (2003), pp. 357-371.

Kumar et al., "Selective laser sintering: A qualitative and objective approach", JOM., vol. 55, (2003), pp. 43-47.

Lappo et al., "Discrete multiple material selective laser sintering (M2LS): experimental study of part processing", Solid Free, Fabr. Symp. Univ. Texas, Austin, TX., vol. 6, (2003), pp. 109-119.

Lee et al., "Lasers in additive manufacturing: A review", Int. J. Precision Eng. Manufact-Green Technol., vol. 4, No. 3, (Jul. 2017), pp. 307-322.

Liew et al., "Dual Material Rapid Prototyping Techniques for the Development of Biomedical Devices", Part 1: Space Creation, Int. J. Adv. Manuf. Technol., vol. 18, (2001), pp. 717-723.

Ngo et al., "Additive manufacturing (3D printing): A review of materials, methods, applications and challenges", Composites Part B: Engineering, vol. 143, (Jun. 2018), pp. 172-196.

Richards et al., "Optimising Thermoplastic Polyurethane for Desktop Laser Sintering", in: Solid Free. Fabr. 2017 Proc. 28th Annu. Int., Solid Freeform Fabrication Symposium, 2017.

Roy et al., "Very Low Thermal Expansion Coefficient Materials", Annu. Rev. Mater. Sci., vol. 19, (1989), pp. 59-81.

Santosa et al., "Experimental and numerical study on the flow of fine powders from small-scale hoppers applied to LS multi-material deposition—part I", Sffsymposium. Engr. Utexas. Edu. (n.d.), http://sffsymposium.engr.utexas.edu/Manuscripts/2002/2002-70-Santos.pdf (accessed Apr. 26, 2019).

Singh et al., "Investigation of Dimensional Accuracy/Mechanical Properties of Part Produced by Selective Laser Sintering", Int. J. Appl. Sci. Eng., vol. 10, (2012), pp. 59-68.

The State of 3D Printing Edition 2018, n.d. https://www.sculpteo.com/media/ebook/State_of_3DP_2018.pdf (accessed Apr. 23, 2019).

Toursangsaraki, "A Review of Multi-material and Composite Parts Production by Modified Additive Manufacturing Methods", (2018), http://arxiv.org/abs/1808.01861 (accessed Jul. 27, 2019).

Tran et al., "Bimaterial 3D printing and numerical analysis of bio-inspired composite structures under in-plane and transverse loadings", Composites Part B: Engineering, vol. 108, (Jan. 2017), pp. 210-223.

Vaezi et al., "Multiple material additive manufacturing—Part 1: a review", Virtual Phys, Prototyp., vol. 8, (2013), pp. 19-50.

Vasquez et al., "Optimum sintering region for laser sintered nylon—12", Proc. Inst. Mech. Eng. Part B J. Eng. Manuf., vol. 225, (2011), pp. 2240-2248.

Weng et al., "Mechanical and thermal properties of ABS/montmorillonite nanocomposites for fused deposition modeling 3D printing", Mater. Des., vol. 102, (2016), pp. 276-283.

Williams et al., "Bone tissue engineering using polycaprolactone scaffolds fabricated via selective laser sintering", Biomaterials, vol. 26, (2005), pp. 4817-4827.

Williams et al., "Novel use of an aerospace selective laser sintering machine for rapid prototyping of an orbital blowout fracture", Int. J. Oral Maxillofac. Surg., vol. 39, (2010), pp. 182-184.

Wohlers et al., Wohlers report 2018 : 3D printing and additive manufacturing state of the industry : annual worldwide progress report., n.d.—password protected Ebook, cannot be uploaded on EFS Web.

Wu et al, Bioinspired Ultra-Low Adhesive Energy Interface for Continuous 3D Printing: Reducing Curing Induced Adhesion, Research, vol. 2018, Dec. 2018, 10 pages.

Yap et al., "Review of selective laser melting: Materials and applications", Appl. Phys. Rev., vol. 2, No. 4, (Dec. 2015), pp. 041101.

(56) References Cited

OTHER PUBLICATIONS

Yi et al., "Three dimensional printing of carbon/carbon composites by selective laser sintering", Carbon, vol. 96, (Jan. 2016), pp. 603-607.

Zhang et al., "A programmable microenvironment for cellular studies via microfluidics-generated double emulsins", Journal of Materials Processing Technology, vol. 34, Issue 19, (Jun. 2013), pp. 4564-4572.

* cited by examiner

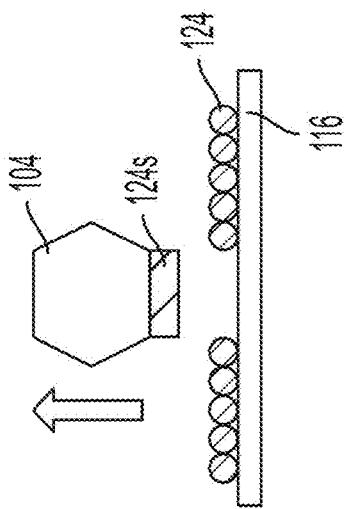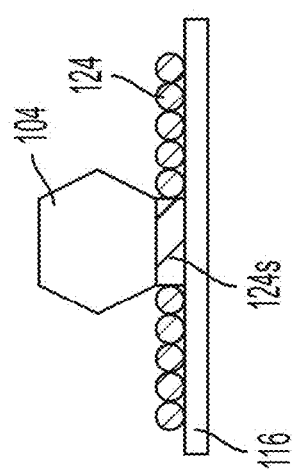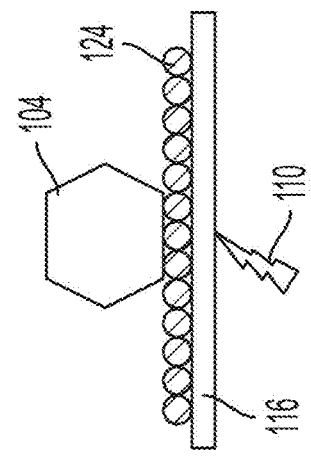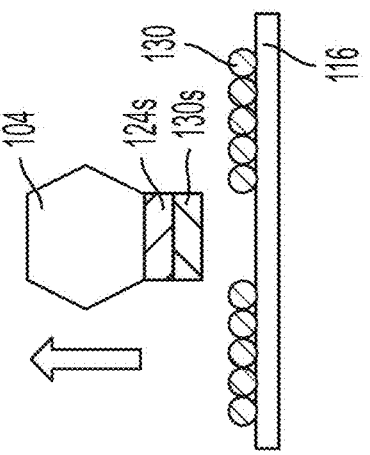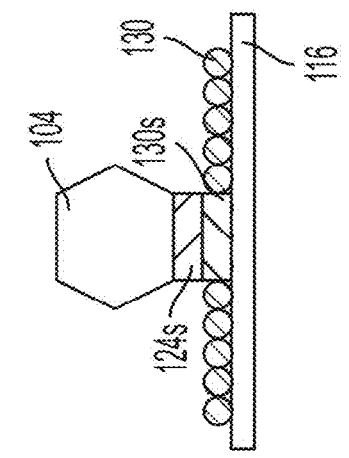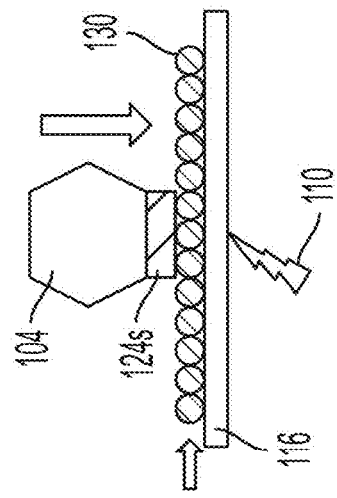

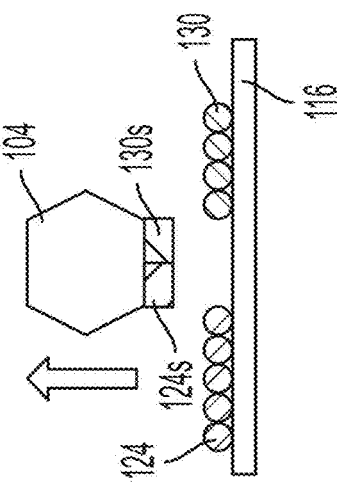
FIG. 13A
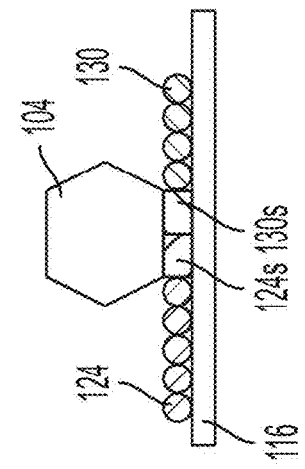
FIG. 13B
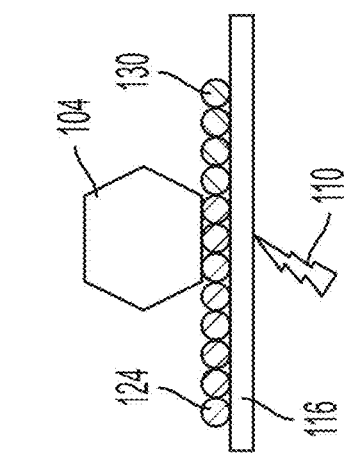
FIG. 13C
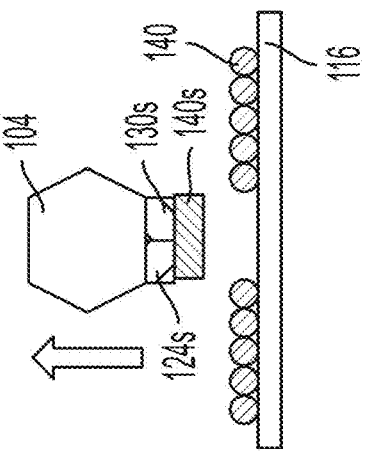
FIG. 13D
FIG. 13E
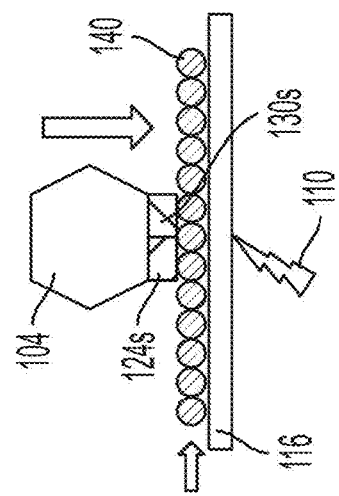
FIG. 13F

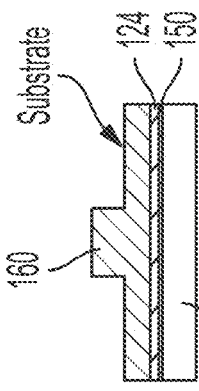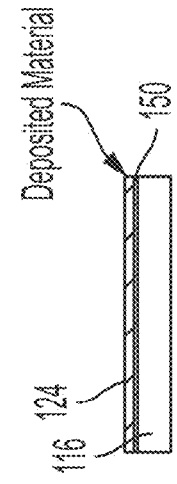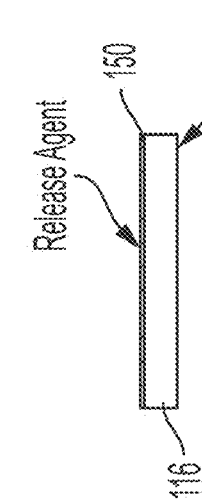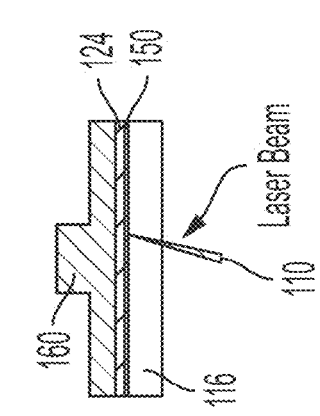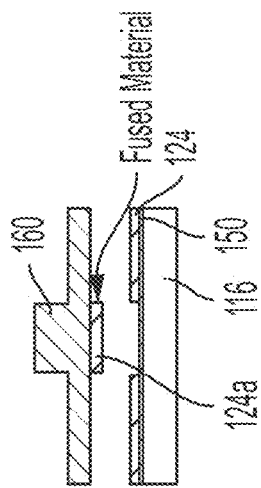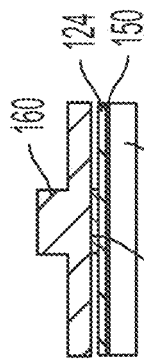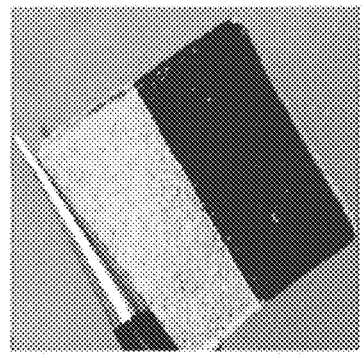

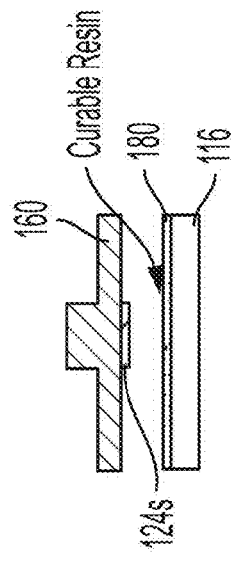
FIG. 24A
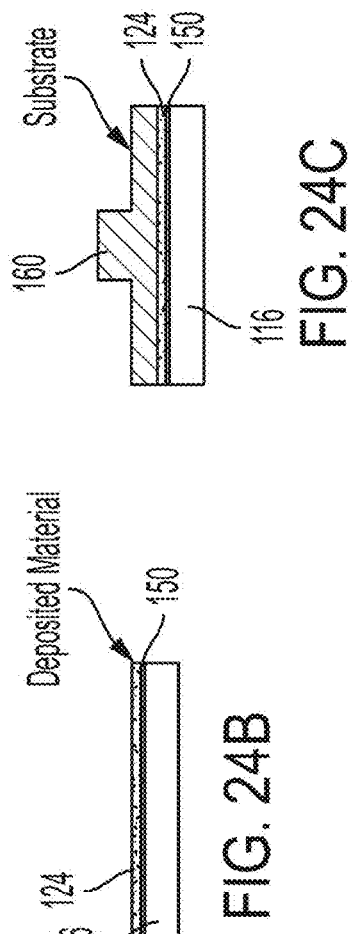
FIG. 24B
FIG. 24C
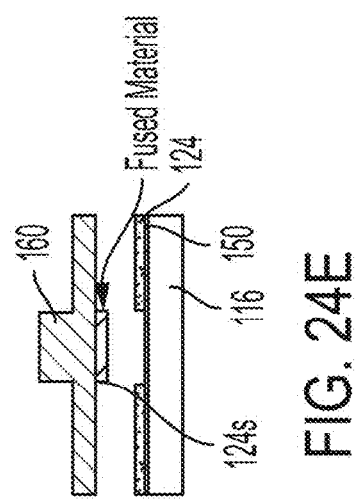
FIG. 24D
FIG. 24E
FIG. 24F
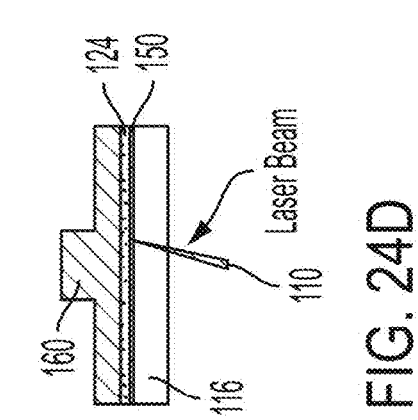
FIG. 24G
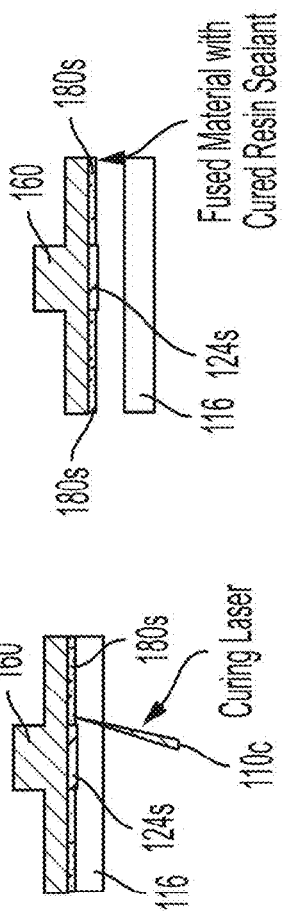
FIG. 24H
FIG. 24I
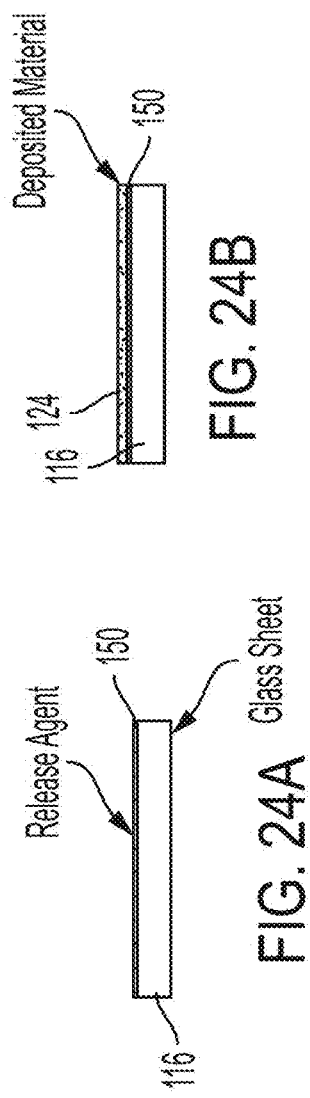
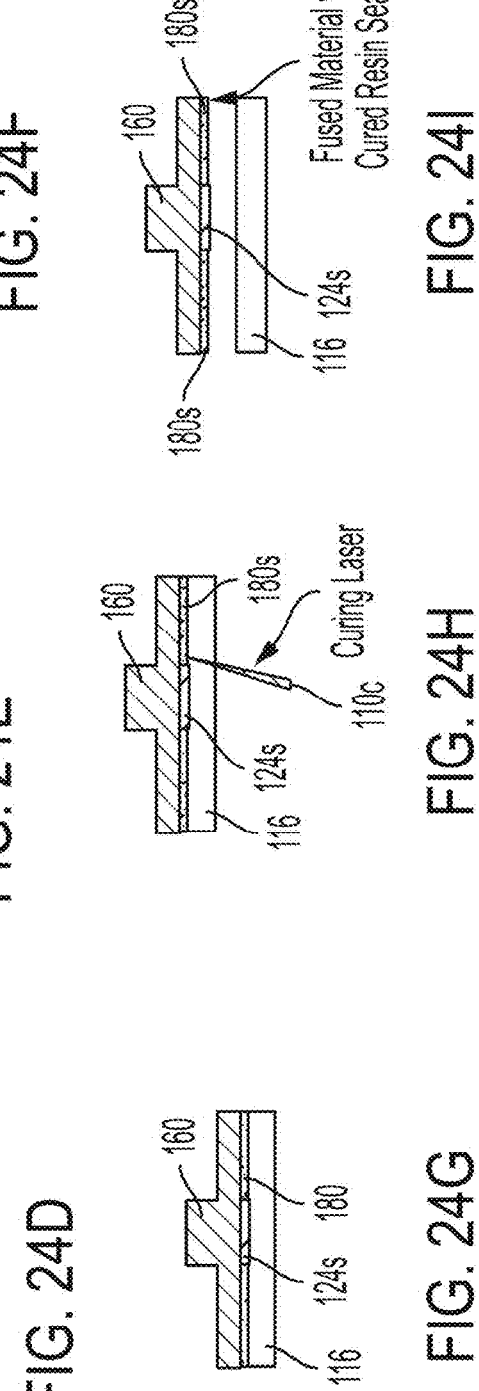

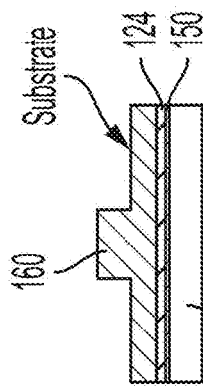
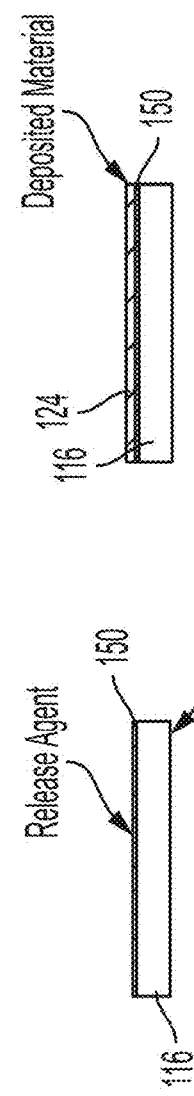
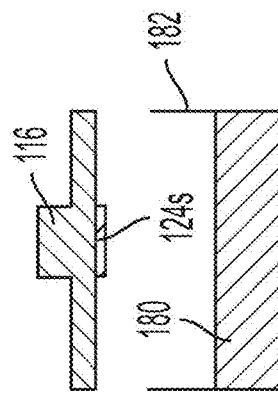
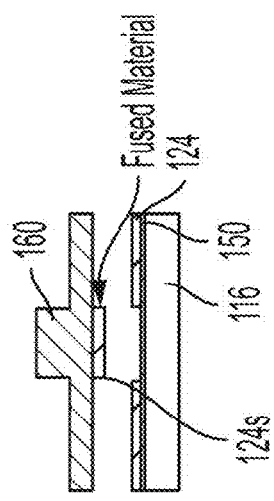
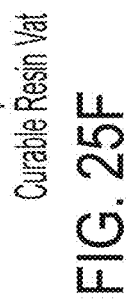
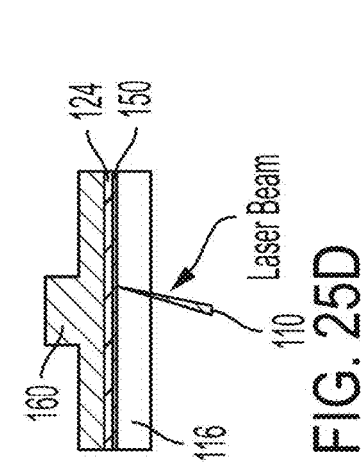
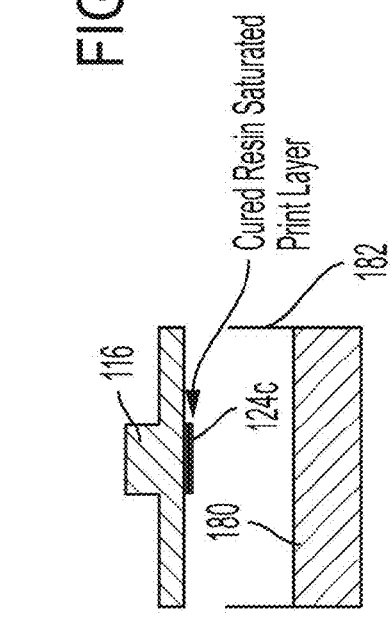
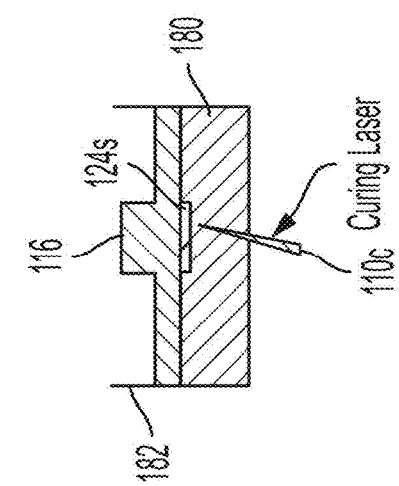

INVERTED LASER SINTERING SYSTEMS FOR FABRICATION OF ADDITIVELY-MANUFACTURED PARTS

RELATED APPLICATIONS

The present application claims priority to and the benefit of U.S. patent application No. 62/802,744, "Inverted Selective Laser Sintering 3D Printer With Multi-Material Implants" (filed Feb. 8, 2019) and U.S. patent application No. 62/945,768, "An Inverted Selective Laser Sintering 3D Printer With Multi-Material Implants" (filed Dec. 9, 2019), the entireties of which foregoing applications are incorporated herein by reference for any and all purposes.

TECHNICAL FIELD

The present disclosure relates to the field of additive manufacturing.

BACKGROUND

The field of 3D printing has, in recent years, experienced a massive gain in popularity within both the academic and industrial worlds. One of the most widely used branches of 3D printing is Selective Laser Sintering (SLS). SLS printers use lasers to melt together micron-sized material particles to construct a larger, solid part. This part is built up from these particles layer by layer in a print bed, with the un-sintered particles acting as support material. These particles can range from plastics to metals, not unlike other types of 3D printers, but at a much higher resolution (~0.06 mm for SLS printers vs. ~0.17 mm for fused deposition modeling (FDM) machines).

A disadvantage of SLS printers is that they can be wasteful. This is because these printers heat their print beds to near melt temperature in order to facilitate the sintering. The un-sintered material still undergoes some chemical and mechanical changes that negatively affects its predictability, frequently resulting in it being discarded. In addition, the unfused powder bed, while sometimes necessary to support a part, has the downside of making the printed part impossible to monitor until the object is removed from the un-sintered material. This can further contribute to the waste generated by traditional laser sintering processes, as any parts that fail to print properly will be discarded and re-printed, wasting both the material used in the failed print, and the powder affected by the new print.

Further, few SLS printers exist that are capable of printing using multiple materials. However, they too suffer the material heating issue, and uncured particles can become irreversibly mixed, further generating waste. Accordingly, there is a long-felt need in the art for improved SLS printers and related methods.

SUMMARY

In meeting the described long-felt needs, the present disclosure provides novel SLS fabrication systems (and related methods) that form parts by, e.g., directing a laser up into a layer of particulate (e.g., polymer powder, metal powder, and the like) upward through a transparent substrate that supports the particulate. By attaching the part under construction to a moveable build platform, one can utilize multiple material particles kept in separate reservoirs, preventing mixing of different material particles. In addition, the disclosed technology lessens the need for internal and external support structures, thereby reducing the amount of material needed to be heated to generate a part, in turn reducing the amount of material that would ultimately become waste.

Further, the disclosed technology allows for, e.g., printing of complex, conductive channels in a non-conductive medium, allowing for the design of multi-layer circuit boards fabricated in a single component. Utilizing a bendable polymer for the non-conductive material allows for the printing of flexible circuit boards. Additionally, the mechanical properties of the internal and surface regions of the printed part can differ and can thus be tailored to specific engineering applications.

One can also compress the material powder during processing so as to adjust the mechanical properties of a single or select group of print layers. This allows for selectively weakening regions of the print, which can assist in prediction of part failure region, simplifying inspection procedures and informing where safety precautions can be most effective.

In one aspect, the present disclosure provides additive manufacturing systems, comprising: a first support substrate having a first side and a second side, the first support substrate being at least partially transparent to an illumination, and the first side of the first support substrate being configured to support a particulate material such that the particulate material is exposed to the illumination; a first illumination train configured to project the illumination toward the second side of the first support substrate such that the illumination passes through the substrate so as to illuminate the particulate material, the first illumination train optionally being configured to project the illumination in accordance with a preprogrammed pattern; and a print head, the print head being configured to translate a fused region formed from particulate material supported by the first side of the first support substrate in a direction away from the first side of the first support substrate.

In another aspect, the present disclosure provides methods, comprising: disposing a first amount of particulate material such that the particulate material is supported by a first side of a first support substrate, the first side of the first support substrate further comprising a release agent disposed thereon, optionally disposing an amount of a release agent onto the first side of the first support substrate or optionally disposing an amount of a release agent onto the first amount of particulate material, the first support substrate being at least partially transparent to an illumination; projecting an illumination at a second side of the first support substrate such that the illumination effects formation in the first amount of particulate material of a first fused region comprising at least some of the first amount of the particulate material, the illumination optionally being provided in a preprogrammed pattern; and effecting motion of the first fused region of the first particulate material so as to give rise to a distance between the first fused region and the first side of the first support substrate.

Also provided are parts, comprising: a fused region made according to the present disclosure.

Further provided are systems, the systems being configured to perform a method according to the present disclosure.

Additionally disclosed are methods, comprising: projecting an illumination through a first substrate that is at least partially transparent to the illumination so as to give rise to a first fused region of a first particulate material supported by the substrate, a release agent optionally being disposed on the first substrate so as to reduce adhesion between the first substrate and the fused region of the first particulate material, the projecting optionally being performed so as to provide the illumination in a preprogrammed pattern; and projecting an illumination through a second substrate that is at least partially transparent to the illumination so as to give rise to a second fused region of a second particulate material supported by the second substrate, the second substrate optionally being the first substrate, a release agent optionally being disposed on the second substrate so as to reduce adhesion between the substrate and the fused region of the first particulate material, the projecting optionally being performed so as to provide the illumination in a preprogrammed pattern; and effecting fusion, by illumination, between the first fused region and the second fused region.

Also disclosed are multimaterial parts, comprising: at least one multimaterial layer, the at least one multimaterial layer comprising (i) a first region formed of a first fused particulate material and (ii) a second region formed of a second fused particulate material, the first particulate material differing in size, particulate composition, or both from the first second particulate material, and the first and second regions being fused to one another.

Further provided are methods, comprising: projecting an illumination through a substrate that is at least partially transparent to the illumination so as to give rise to a first fused region of a first particulate material supported by the substrate, a release agent optionally being disposed on the substrate so as to reduce adhesion between the substrate and the fused region of the first particulate material, the projecting optionally being performed so as to provide the illumination in a preprogrammed pattern; and projecting an illumination through the substrate so as to give rise to a second fused region of a second particulate material supported by the substrate, a release agent optionally being disposed on the substrate so as to reduce adhesion between the substrate and the fused region of the second particulate material, the projecting optionally being performed so as to provide the illumination in a preprogrammed pattern; and effecting fusion, by illumination, between the first fused region and the second fused region.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document. In the drawings:

FIG. 12A, FIG. 12B, FIG. 12C, FIG. 12D, FIG. 12E, and FIG. 12F illustrate an exemplary fabrication sequence according to the disclosed technology;

FIG. 13A, FIG. 13B, FIG. 13C, FIG. 13D, FIG. 13E, and FIG. 13F illustrate an exemplary fabrication sequence according to the disclosed technology;

FIG. 14A, FIG. 14B, FIG. 14C, FIG. 14D, FIG. 14E, and FIG. 14F illustrate an exemplary fabrication sequence according to the disclosed technology and FIG. 14G illustrates a multi-material sample generated with this process;

Figure 1:
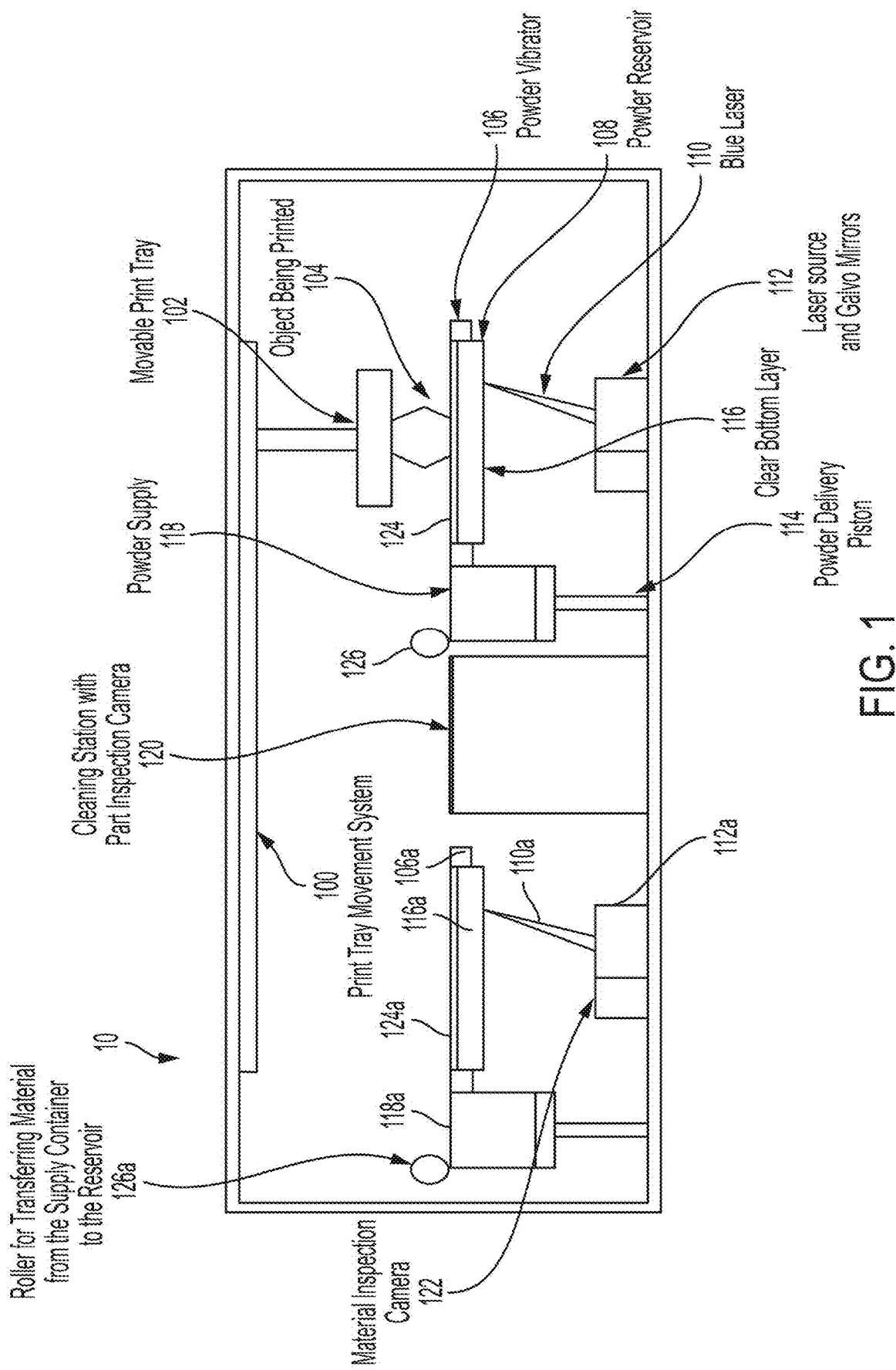
FIG. 1 provides a depiction of an exemplary system according to the present disclosure.

was removed from the material coated glass (white and clear), and the white material was distributed in an even, homogenous layer.

FIG. 24A, FIG. 24B, FIG. 24C, FIG. 24D, FIG. 24E, FIG. 24F, FIG. 24G, FIG. 24H, and FIG. 24I illustrate an exemplary fabrication sequence according to the disclosed technology.

FIG. 25A, FIG. 25B, FIG. 25C, FIG. 25D, FIG. 25E, FIG. 25F, FIG. 25G, and FIG. 25H illustrate an exemplary fabrication sequence according to the disclosed technology.

DETAILED DESCRIPTION OF ILLUSTRATIVE EMBODIMENTS

The present disclosure may be understood more readily by reference to the following detailed description taken in connection with the accompanying figures and examples, which form a part of this disclosure. It is to be understood that this disclosure is not limited to the specific devices, methods, applications, conditions or parameters described and/or shown herein, and that the terminology used herein is for the purpose of describing particular embodiments by way of example only and is not intended to be limiting of the present disclosure.

Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable, and it should be understood that steps can be performed in any order.

It is to be appreciated that certain features of the disclosed technology are, for clarity, described herein in the context of separate embodiments, may also be provided in combination in a single embodiment. Conversely, various features of the disclosed technology are, for brevity, described in the context of a single embodiment, can also be provided separately or in any subcombination. All documents cited herein are incorporated herein in their entireties for any and all purposes.

Further, reference to values stated in ranges include each and every value within that range. In addition, the term "comprising" should be understood as having its standard, open-ended meaning, but also as encompassing "consisting" as well. For example, a device that comprises Part A and Part B can include parts in addition to Part A and Part B, but can also be formed only from Part A and Part B.

Introduction

Selective Laser Sintering

The field of additive manufacturing (AM) has experienced strong growth over the decade, with an annual growth rate surpassing 20%. Laser Sintering (LS) is the most widely used AM method of the industrial processes and is responsible for the largest portion of that growth.

Traditionally, LS works by using downward-directed lasers to sinter together microscale material particles in a powder bed so as to generate a final part. Parts are built up from particles layer by layer, with the unsintered particles acting as support material for any thin or overhanging sections of the printing part.

A wide range of materials can be used in the LS process, including a variety of thermoplastics and metals. The LS manufacturing process generates highly durable parts with strengths typically superior to parts generated through other AM processes. LS can also manufacture parts having a variety of geometries, such as lattices, which are challenging to fabricate using other AM processes. Further, in contrast to most other AM processes, parts generated on a LS machine can be functional end use pieces. These benefits have enabled LS processes to revolutionize a variety of fields, including industries such as defense, biomedical, and aerospace, to name but a few fields.

Despite their industry-wide adoption, traditional LS processes have several major disadvantages. First, LS processes require a full powder bed that is heated to near-melt temperatures in order to facilitate particle sintering. This ambient heating can cause chemical and physical changes that negatively affect material predictability, resulting in unfused particles being thrown out or requiring a transfusion of unheated material to be useable.

Second, the unfused powder bed, while sometimes necessary to support a part, has the downside of making the printed part virtually impossible to monitor until the object is removed from the un-sintered material. This can further contribute to the waste generated by traditional LS processes, as any parts which have failed to print properly will be discarded and re-printed, wasting both the material used in the failed print, and the powder affected by the new print.

An additional key disadvantage of LS processes is they typically allow for sintering only a single material at a time.

Multi-Material Printing

Due to the large variety of available materials, successful multi-material AM has a wide array of practical applications, such as the development of graded alloys, or the ability to fabricate parts out of multiple types of thermoplastic polymers such as rigid parts with overmolds.

Previous work focused on developing multi-material AM methods for laser sintering equipment, either by replacing un-sintered material in a given layer with a secondary powder using a vacuum, or by placing an initial layer with spaces for material to be filled in using a separate deposition device (often a secondary vacuum mechanism). Analysis has, however, shown that contamination of one section with un-sintered material from another using the outlined methods is a persistent problem.

Other approaches for multi-material laser sintering include LENS/DED processes that jet multiple powders into the focal point of a laser beam. The LENS process has many advantages including the ability to add material to existing parts and conform to existing complex geometries, but the process is wasteful in powder usage since the powders cannot be easily separated after the spraying. Additional approaches are currently in development that would allow for multi-material printing but are not yet commercially available and would in any event require users to purchase special powders to act specifically as support structures.

Inverted Laser Sintering (ILS)

This disclosure provides a LS process design that sinters material particles together by directing a laser vertically upwards into a thin layer of powder through a support pane (e.g., glass) underneath the print bed. One can call this process Inverted Laser Sintering (ILS).

The first step of ILS can involve coating the support (e.g., glass) with a release agent and depositing a controlled quantity of material on top of this support. One can distribute the powder evenly using vibration to form a monolayer. Excess material can be removed using a vacuum device, as the release agent can act to capture a single layer of powder. The release agent is not strictly necessary, as powder could also be distributed freely directly onto the support.

Next, a build plate is then located on top of the unfused powder monolayer, and a laser (e.g., a blue laser) is used to selectively fuse the particulate material onto this substrate. Finally, the build plate is lifted, and material on the support is replenished. This process can be repeated, with the new material layer fusing to the previous material layer, until the print is completed (FIG. 14). A force can optionally be applied to help increase adhesion between the sintered material and the print platform or previous layers and increase the density of the resulting part.

Using multiple plates, it is possible to use multiple print materials, thereby enabling the manufacture of graded and multi-material parts. Multi-material fabrication can be accomplished by keeping different materials in separate beds, and transporting the platform between glass panes, preventing the material mixing which would be caused by multiple materials in a single, traditional LS process print bed. Multiple beds with identical material could also be used in parallel to speed up the processing, so that one bed is prepared while the other us being used.

Transporting the part between multiple print beds also allows for an integrated cleaning mechanism that removes any loose powder, in order to prevent cross-contamination. This method of printing also reduces the amount of material needed to generate a part by eliminating the need for surrounding passive support material bed, thus reducing the amount of material needed to be exposed to a heated environment to generate the print.

Furthermore, the ability to raise and lower the printing platform allows for active compression of the un-sintered material between this platform and the support, potentially increasing part density and decreasing porosity.

Materials and Methods

Demonstration

To demonstrate this concept, a system was developed for fusing two thermoplastic polymers into a single layer. For this laser setup, we used a 2.8 W blue laser (445 nm, J Tech Photonics), which was tuned down to 1.3 watts at 1.25 amps to increase the system's longevity and reduce heat generation. The laser was directed towards the intended sintering location by a set of mirror galvanometers (Seed Studios) controlled by an Arduino Uno. A standard $CO_2$ laser was not selected as it would interact with the chosen clear glass, whereas a blue laser transmits directly through into the material. (As discussed elsewhere herein, one can use a variety of lasers, and the choice of laser will be known to the person of ordinary skill in the art.)

The demonstration system (see FIG. 15) was constructed with mirrors directing the beam upwards. To prevent adhesion between the laser affected material and the glass, a high temperature, optically clear release agent was applied to the glass between each sintering cycle. The release agent (Water Soluble Mold Release Agent, SLIDE™) was chosen because of its maximum operating temperature (232° C.), its optical clarity, and the fact that it is water soluble, which facilitates its removal from any un-sintered material.

To reduce the chance of damage to the surroundings, a powder bed was constructed of laser protective acrylic (Laser Shielding, J Tech Photonics), and all experiments were conducted within this area. The orange acrylic used was opaque to lasers in the 250 nm-520 nm spectrum, and the material would be damaged by the laser instead of allowing the beam to directly transmit through. This enclosure had the added benefit of containing the powder in a concentrated area underneath the glass. This was useful when operation moved beyond a single layer of material to prevent the powder from moving outside of a bounded area if the enclosure was moved. A secondary containment unit was then fabricated out of 3D printed PLA and the orange acrylic to house the entire laser system.

The orange color of the acrylic (in this illustrative embodiment) was chosen due to the fact that orange is a complementary color to the color of the utilized blue laser. This means that the orange material will most efficiently absorb the blue light, and therefore heat up the most, resulting in the most melting and therefore the greatest amount of adhesion between the heated/sintered powder and the heated/melted raft. Because the orange color is the most efficient at absorbing the laser, that also makes it a preferred choice for creating a protective surrounding/enclosure, as the orange material will best absorb the light instead of allowing it to transmit through (as may occur if the enclosure were made of a clear material) and pose an issue to the surroundings or to users. (It should be understood, however, that the presently disclosed technology is not limited to lasers having wavelengths that may pose an issue to their surroundings or to users or to lasers of any particular wavelength.)

Multi-Material Selection

Two different powders were used to demonstrate the multi-material printing capabilities of the disclosed technology. The first one selected was Nylon 12, also known as PA12 (dark gray, Sintratec Ltd). This exemplary material was chosen for three reasons.

First, PA12 is a commonly used and widely available LS material, which makes the powder easier to find commercially in smaller quantities (~2 L containers). Second, PA12 is a thermoplastic material, implying that this powder has a relatively low sintering temperature (~176° C.) when compared to glass or metal powders. This low melt temperature was useful (but not required), as the demonstration did not utilize a heated print environment and therefore did not have an initial temperature baseline increase. Third, PA12 has been used in existing commercial desktop LS printers which incorporate blue lasers in a traditional downwards facing configuration.

White TPU (Sinterit) was the second material selected. This selection was due to the color difference, which makes the distinction between the two materials in a printed part visually apparent, as well as TPU's melting temperature (~160° C.), which is comparable to the Nylon's. This comparable melting temperature was useful, as one can keep the laser's power fixed during operation. (It is not required, however, that the different materials in a given part have comparable melting temperatures, and one can also apply illumination of different/varying intensities and/or wavelength during performance of the disclosed technology.)

Refraction Compensation

Figure 16:
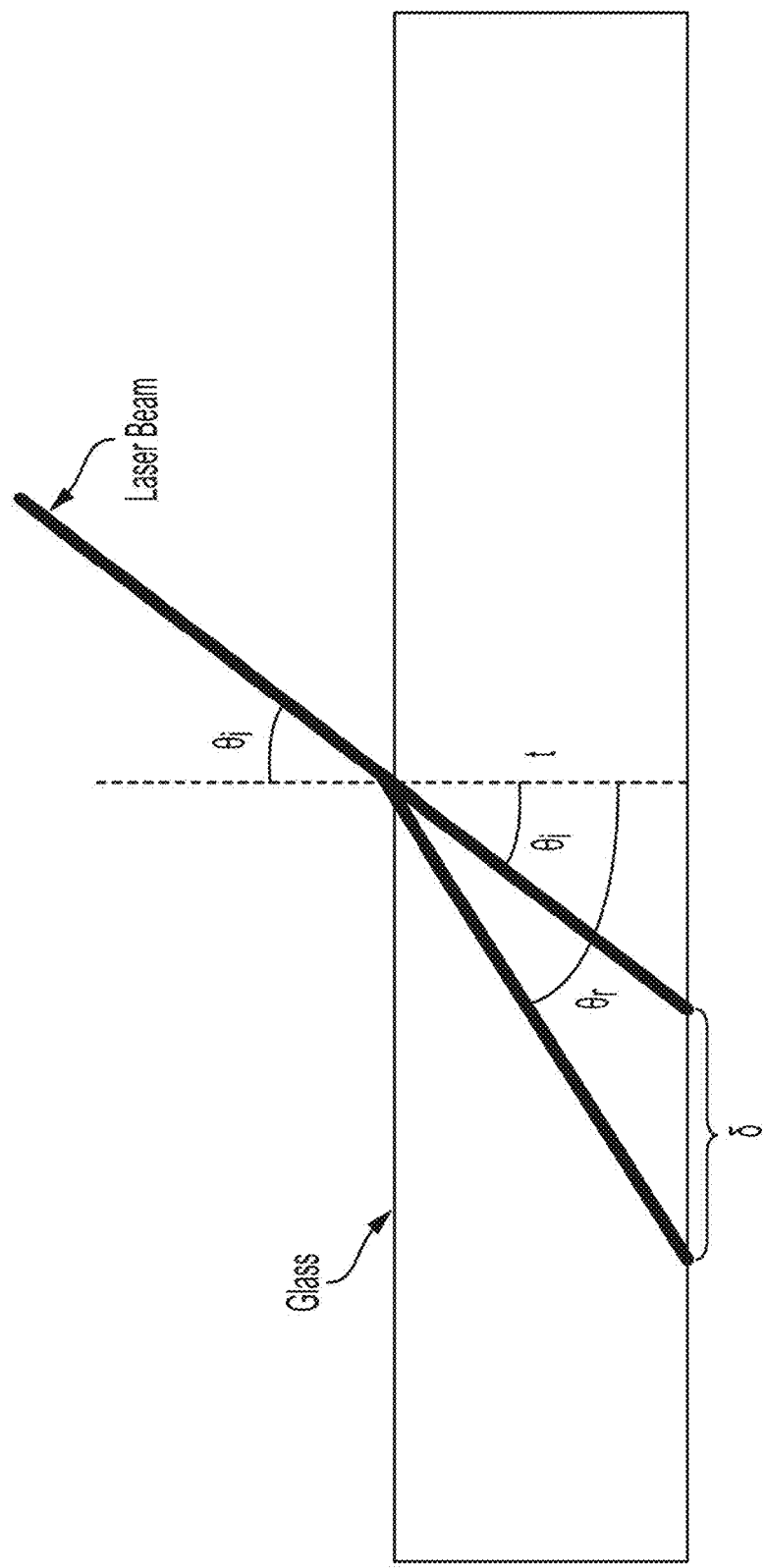
FIG. 16 provides an illustrative diagram of laser refraction.

The use of a glass slide can introduce optical refraction into the LS process, changing the location and overall shape of the print layer being generated. In order to evaluate the effect of the laser on our chosen materials through a clear medium, borosilicate glass was purchased, which was selected due to that material's relatively low coefficient of thermal expansion. A low coefficient was useful (though not required) to mitigate effects of thermal shock, which can cause materials to fail during a period of rapid heating and cooling, as might have been caused by the sudden exposure of the glass to the laser and the heated material with which the pane is in contact. The position change of the beam can be calculated by first determining the angle of refraction from Snell's law (Eq. 1):

$$\theta_r = \arcsin\left(\frac{n_i * \sin(\theta_i)}{n_r}\right) \quad (1)$$

where $n_i$ is the refractive index of the incident medium (air, ~1), $n_r$ is the refractive index of the glass (~1.47), $\theta_i$ is the incident angle of the beam and Or is the refraction angle (FIG. 16). Taking both angles, one can calculate the distance from the point where the beam entered the glass to the point of sintering projected onto the material with and without the refraction (respectively) using (Eq. 2 & Eq. 3):

$$\delta_i = t * \tan(\theta_i) \quad (2)$$

$$\delta_r = t * \tan(\theta_r) \quad (3)$$

The difference between the two distances is the beam offset cause by the glass projected onto the material plane (Eq. 4):

$$\delta = t * (\tan(\theta_r) - \tan(\theta_i)) \quad (4)$$

where $\delta$ is the offset between the expected sintering point (without beam refraction) and the actual sintering point, and t is the thickness of the glass.

For calculations, one can assume the laser directly transmits from the bottom side of the glass into the material without any additional intermediary refractive index. The calculated offset informed the decision to maximize the distance from the laser to the glass, to reduce the distance between the laser and any sintering point, thus decreasing the incident angle. Additionally, glass thickness was limited (~3.175 mm), and the size of our sintering area (50.8 mm by 50.8 mm) to further decrease any print deformation.

Testing

Sintering Parameters

To increase adhesion of the sintered material to the passive print platform, we incorporated a pre-fabricated orange PLA substrate which was fabricated on a fused deposition modelling (FDM) 3D printer (Ultimaker 3). As the substrate is also made of a thermoplastic, the powders being used can effectively bond to the substrate's surface. The PLA substrate can, of course, also be fabricated from a different thermoplastic (i.e., ABS, Acrylic), including materials that can be easily dissolved, such as through submersion in acetone.

Figure 17:
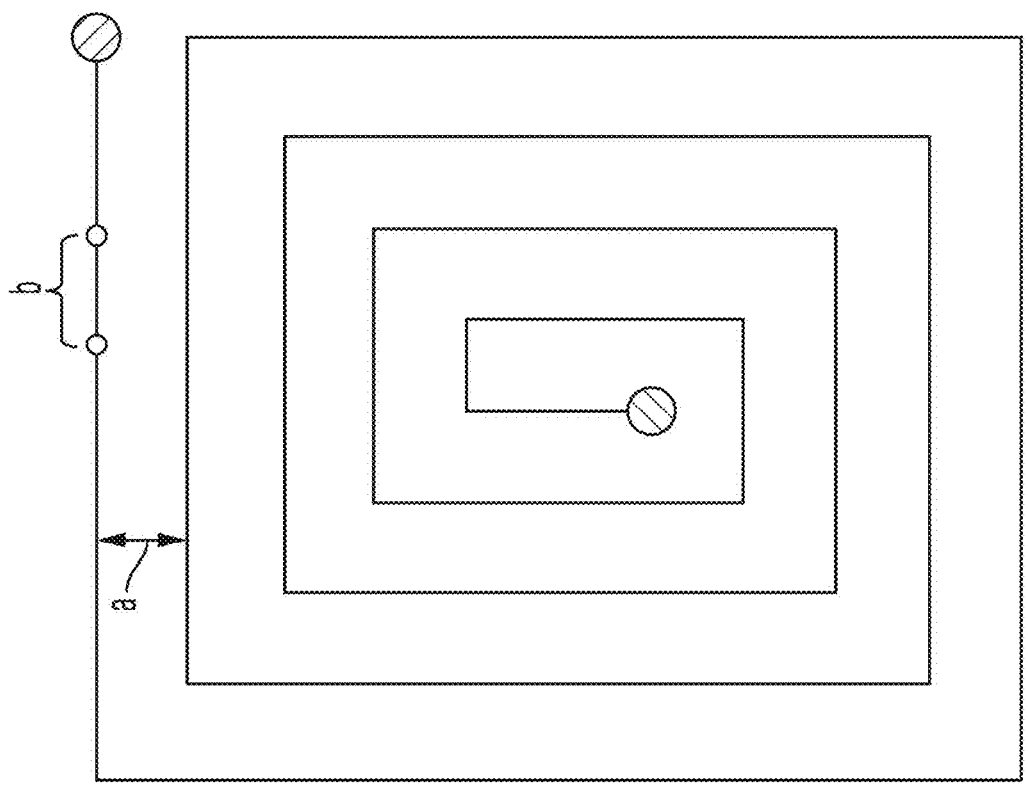
FIG. 17 provides a spiral sintering pattern diagram, in which pattern parameter a is the spacing between consecutive spirals, and parameter b is the laser propagation speed. Sintering starts at the upper right dot and ends at the middle dot.

Sintering was done using a rectangular spiral pattern due to the pattern's ability to be easily tessellated. Initial determination of parameters for the rectangular spiral pattern focused on the spacing between consecutive spirals and the laser propagation speed to affect print layer generation. The propagation speed was controlled by the distance between successive points of laser exposure in the spiral pattern, as well as the time delay between moving from one point to the next (FIG. 17). These factors all have an effect on spiral time to completion. Settings were constant for the entire laser spiral pattern.

Evaluation was done by adjusting the parameters, taking into account the melting temperatures of the different materials and color differences that affect the absorption of the laser energy. As a result, different parameters were chosen for the two different materials. Parameters were adjusted to ensure sintering of the material while reducing time to completion of the spiral pattern.

Print Strength and Laser Melting Depth

The use of a platform that can be raised and lowered allows for different applied loading pressures during each layer generation by using the platform to compress the material between the substrate or the previous print layer and the glass with a controlled amount of force. This has can be used to affect part density, either by changing the uniform density of the part or allowing for different densities throughout by applying different loads at different layers or even at different locations on a given layer. (Particulate material can also be additional heated and/or additionally cooled, in addition to being exposed to illumination that forms a fused region from the particulate material.)

To evaluate the effects of applied loading, print samples were made by placing ~2 g of material on the glass, distributed across the surface both with and without the compression of a 1 kg weight (Troemner). With pre-determined parameters, this amount of material was determined to be a sufficient quantity that, when evenly spread over the glass, was enough to prevent the laser from penetrating all the way through. The laser then sintered a rectangular spiral through the glass, generating a print layer with outer dimensions of 18.27 mm by 16.16 mm. The 1 kg load was evenly distributed over the material undergoing compression, resulting in a pressure of 33.2 kPa on the powder surface. After sample generation, the excess material was manually disposed of, and the resulting print sample was removed from the glass and subsequently evaluated. The foregoing load is exemplary only, and a constant (or variable) load can be applied to particulate material. Application of a load is not, however, a requirement.

Evaluation was repeated three times per loading condition. Evaluatinos were conducted with the TPU powder. After samples were generated, samples were strained in an Instron 5569 until failure to determine ultimate force and displacement at the ultimate force. After evaluation, samples were disposed of.

In addition to evaluating the performance of raw material undergoing different loading conditions, also evaluated was material that encountered the release agent to determine if the release agent had some measurable impact on the mechanical properties of a sintered powder layer. This was accomplished by directly applying the agent to a controlled quantity of TPU material, then allowing sufficient time (~2 days) for complete evaporation of any fluids, leaving behind solely the TPU and any residue that might remain as a coating on the material. The remaining powder was then evaluated in the same manner as the compressed, unaffected material using the same laser parameters. The resulting sample data was compared to that of the unaffected material.

Inverted Print Generation

To evaluate the disclosed printer design, a multi-layer print was generated out of the TPU and Nylon powders with the laser in an upwards directed configuration. This was done by first coating the upper surface of the borosilicate glass with the release agent, then manually distributing the TPU powder onto the glass. Excess material was removed via a vacuum.

The release agent, in addition to preventing adhesion of sintered material to the glass, retains a single sintering layer of un-sintered material powder due to the agent's relatively high viscosity liquid state after excess is removed. The material-coated glass was then placed above the mirror galvanometer array, a material substrate was placed on top, and a 33.2 kPa load was applied to the raft. The laser was directed in a square spiral pattern to sinter the new layer to the previous layer(s).

After the TPU rectangle was completed, the load and substrate with the fused material was removed, and the glass was replaced with an identical glass piece coated with a single print layer of Nylon, also captured using the release agent. The substrate and load are placed on this new glass and the laser was run again to fuse a Nylon spiral next to the TPU spiral, in the same layer. Between each layer, all unfused material was removed from the glass and the glass was recoated with a new quantity of material and release agent. This generated a multi-material sintered sample with multiple materials in the same layer.

Results

Sintering Parameters

To determine the heating profiles of the selected materials during the spiral generations, we directly monitored the heated material using a thermal camera (C2 Thermal Imaging Camera, FLIR) with imaging in the 7.5-14 μm spectral range and ~0.94 emission coefficient. This was accomplished by temporarily placing the laser in a downward configuration and distributing material evenly in a reservoir in the path of the laser without anything between the powder and beam. This downward configuration was useful, as it allowed one to directly monitor heating at the point of interaction between the laser and the powder, which would have been challenging with the glass acting as insulation.

The maximum temperatures recorded during the sintering process for the Nylon and the TPU were both found to be ~180° C. at the center of the spiral, increasing from an ambient temperature of ~30° C. (FIG. 18). One can note that the maximum temperature in the sintering pattern increases as the laser reaches the center of the spiral. Without being bound to any particular theory, this may be due to the decreased time between when the laser reaches a point near where the beam previously sintered material, allowing for less cooling time. Additionally, due to the camera's limited maximum temperature detection capabilities (180° C.), higher temperatures were likely reached towards the spiral's center and not recorded, as evidenced by plateaus in the graphs.

The use of the release agent allows for a substantial range of possible sintering parameters. This is due to the fact that the incorporation of this spray prevents any material adhesion to the glass during sintering, rendering exposure of the laser to the material trivial. To prevent over-sintering, parameters were experimentally determined that would effectively fuse the material powders, both in layer and layer-to-layer while also minimizing spiral time to completion (Table 1, below).

TABLE 1

Processing parameters

| Material | Time Delay (ms) | Exposure Distance (b) | Spiral Distance (a) |
|---|---|---|---|
| Nylon 12 | 0.035 | 4 | 10 |
| TPU | 0.035 | 20 | 10 |

Print Strength and Laser Melting Depth

As the laser did not penetrate all the way through the material deposited onto the glass, one could determine the maximum melting depth of the laser was ~0.3 mm for the TPU and ~0.15 mm for the Nylon (with no loading) by directly measuring sample thickness. The melting depth of the laser was determined to be approximately the same (~0.3 mm) for the loaded TPU.

After the TPU samples were generated and destructively evaluated, the resulting force-displacement data was averaged, filtered and used to determine the average ultimate force and the corresponding displacement (Table 2 below, FIG. 19). After the ultimate force was reached, tearing before a complete failure resulted in a peak force decrease observed on the graph, but not an immediate drop to zero. Compressing the samples led to a greater than three times peak force increase. This change due to different loading conditions can allow for a designed point of failure in the print that is artificially weaker. Additionally, applied weight was found to increase adhesion strength between the sintered material and the PLA print platform.

Samples that underwent loading had a lower average mass. Additionally, closer inspection of the print surface showed that compressed samples had a less porous surface in contact with the glass. Again without being bound to any particular theory, this may imply that the laser overall penetrates the same distance in both samples (as evidenced by their equivalent thicknesses), but creates a much steeper density gradient in the compressed sample due to the beam's inability to easily affect material above the more homogeneous surface in contact with the glass.

Figure 20:
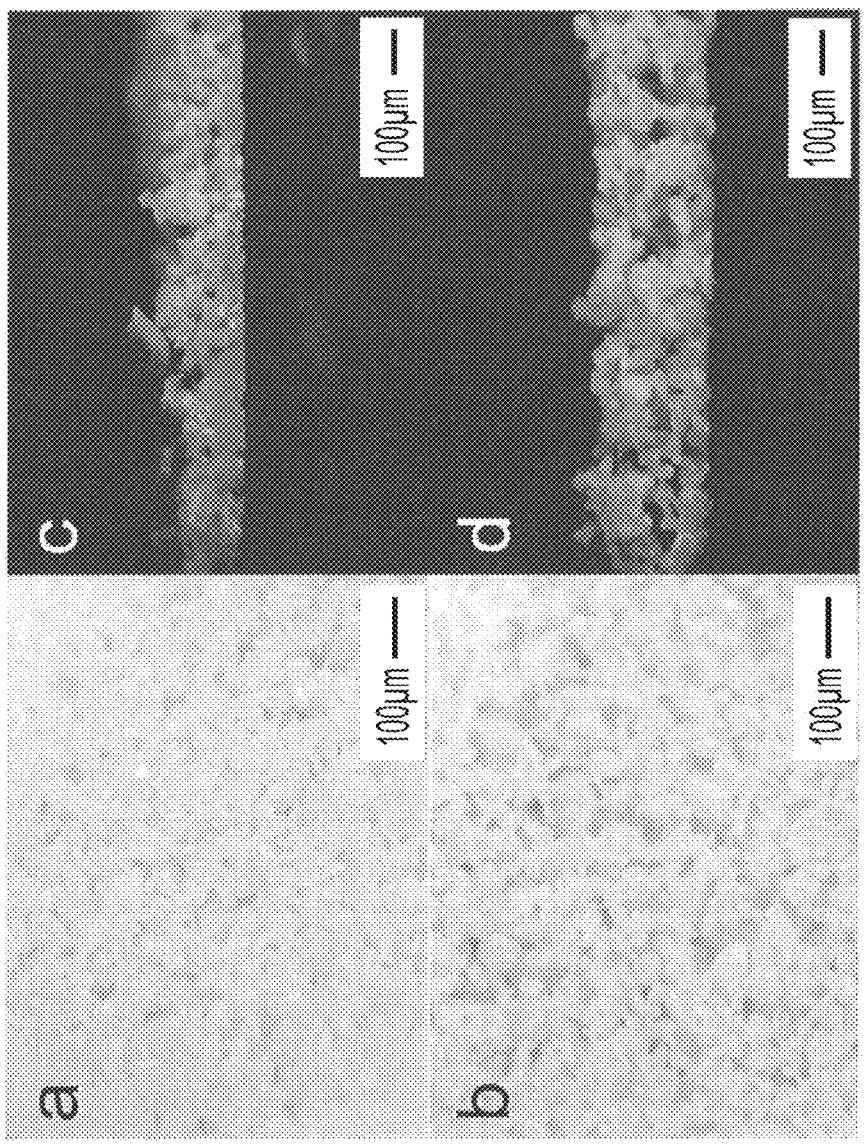
FIG. 20A provides images of the laser affected material with a loaded sample side in contact with glass, FIG. 20B provides images of the laser affected material with unloaded sample side in contact with glass, FIG. 20C provides images of the laser affected material with a cross sectional view of the loaded sample, and FIG. 20D provides images of the laser affected material with a cross sectional view of the unloaded sample.

An analysis of sample cross sections can confirm this hypothesis (FIG. 20). Sintering a thinner deposited layer of un-sintered material, with a thickness of ~50 micrometers (around the maximum diameter of a single material particle) can create a homogenous, stronger compressed sample, with a weight higher than the uncompressed equivalent (Table 2, below).

TABLE 2

Mechanical properties

| Loading Condition | Max Force (N) | Displacement at Max Force (mm) | Average Mass (g) |
|---|---|---|---|
| No Loading | 0.64 | 2.97 | 0.051 |
| 33.2 kPa | 2.09 | 2.28 | 0.042 |

Figure 21:
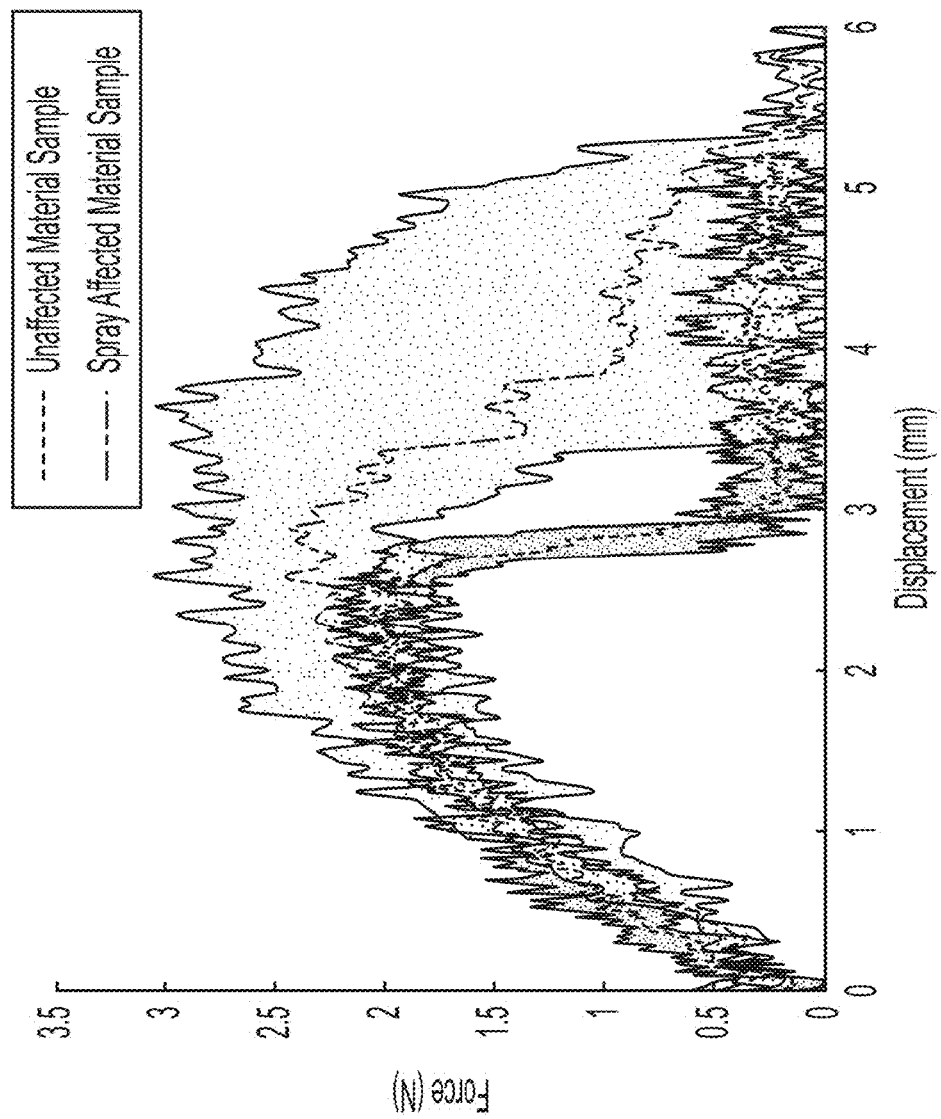
FIG. 21 provides force displacement evaluation for agent affected and unaffected samples.

Print samples generated from release affected material underwent the same destructive evaluation and data filtering procedure (FIG. 21). Both the affected and unaffected material have near identical force-displacement curves, with overlapping error bounds. Without being bound to any theory, this implies that the introduction of release agent has a negligible effect on the strength of the part in any given layer. Any residue remaining on the final printed part can be washed off as the release agent is water soluble if desired. Release agent can be removed between layer assembly.

Inverted Print Generation

Figure 22A:
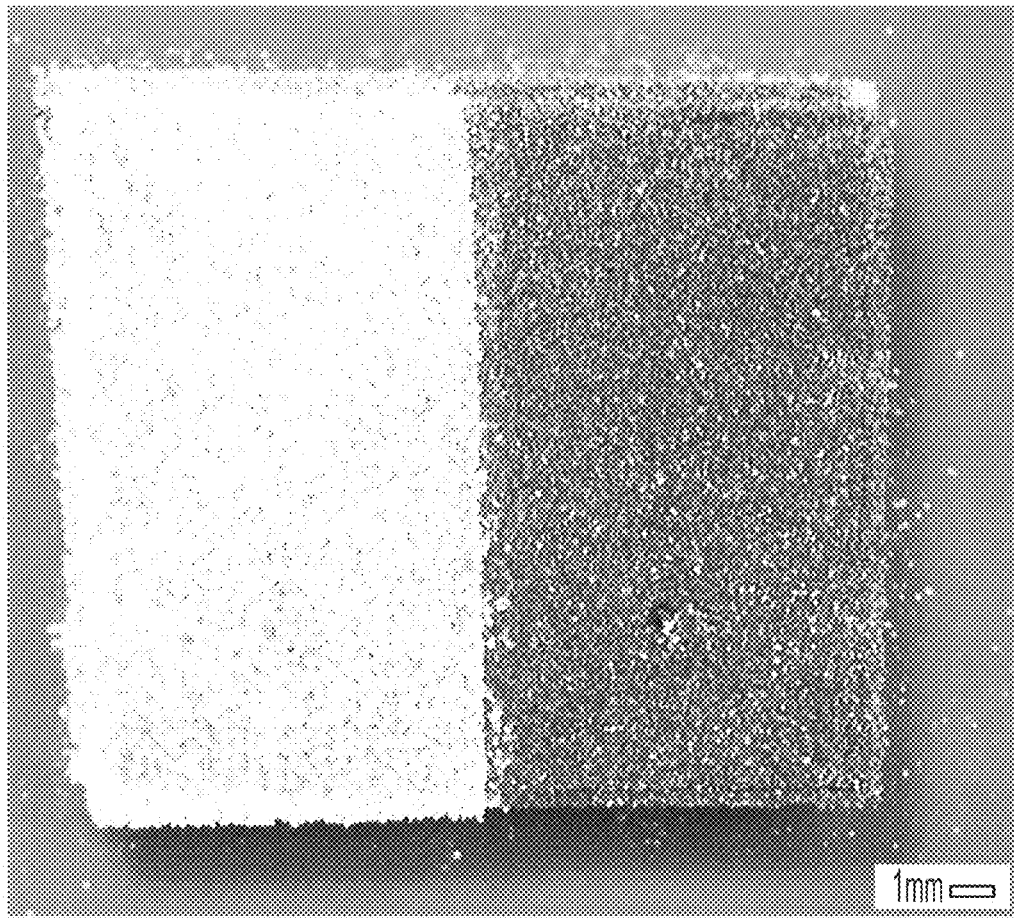
FIG. 22A provides an inverted multi-material sintering pattern on an acrylic raft with a top view, and FIG. 22B provides a profile view of the part shown in FIG. 22A.
Figure 22B:

We generated a multi-layer inverted print pattern that was 11 layers thick and had an overall height of 0.78 mm (FIG. 22). Usage of the release agent to evenly distribute material resulted in a far more uniform height from layer to layer, thereby creating a part with a more homogeneous thickness. The average layer thickness was therefore found to be 0.071 mm, calculated by dividing the overall height of the sample by the number of layers. This ILS print generation was done using the parameters outlined in Table 1, above.

Discussion

Layer Generation

Without being bound to any theory, heating caused by the spiral pattern may unevenly the material across the layer; one can use a raster pattern in place of a spiral pattern. It should be understood, however, that the disclosed technology can be used with a spiral pattern, as a spiral pattern can give rise to an acceptably-performing part. Additionally, changing the propagation parameters of the laser in the spiral pattern so the beam speed increases towards the center of the spiral would even out the laser exposure time to the material.

Inverted Print Generation

The layer thickness of the inverted print (0.071 mm) is well within the standard range of layer thicknesses for LS printers of (20-150 μm). The use of a direct compression mechanism ensures adhesion of material to the previous layer(s)/raft regardless of powder thickness change cause by heating of the material. Furthermore, the use of our release agent to "capture" a single powder layer allows for the repeatable retention of a given layer thickness of material as a function of the quantity of release agent distributed on the glass.

Though the glass was recoated between each layer, it was shown that material directly affected by the release agent can be reused to generate print layers with mechanical properties equal to unaffected material. This allows for un-sintered material to potentially be collected and reused. As the used release agent is water soluble, this presents a method to remove it from the unused material. Additionally, in between each layer, any residue that remains on the glass due to the release agent or the sintering process after excess material is removed can be addressed by directly incorporating a glass cleaning apparatus into the printer design.

Further Overview

In this disclosure is described, inter alia, a novel laser sintering process that utilizes an inverted laser to sinter two thermoplastic powders through a plate onto a moveable print platform. This printing process allows for multi-material laser sintering 3D printing with direct control of the print's mechanical properties.

Reduced material usage is enabled because the disclosed design does not have passive, un-sintered material surrounding the part at each layer, which is both wasteful and obscures the part during fabrication, making part inspection before the process is completed nearly impossible. Additive manufacturing in multiple materials with the proposed design has the potential to expand laser sintering to a wider variety of industries by allowing for fabrication of complex multi-material parts without any assembly.

As discussed, one can use conductive and metallic powders, which allows one to directly generate parts with a wider range of mechanical, electrical and chemical properties that possible with conventional LS systems today.

FIGURES

The attached non-limiting figures illustrate certain aspects of the disclosed technology.

FIG. 1 provides an illustration of an exemplary system according to the present disclosure. (It should be understood that the labels present on FIG. 1 are illustrative only and are not limiting; as one example, illumination 110 can be a red, green, or other-colored laser even though it is labeled as "blue laser" in FIG. 1.) Illumination also need not necessarily be a laser, as other forms of illumination can be used.

As shown, system 10 can include a moveable print tray 102, which moveable print tray can be linked to print tray movement system 100. Print tray movement system 100 can be configured to move print tray 102 in one, two, or three dimensions, and can also be configured to rotate and/or tilt the print tray. Moveable print tray 102 can be linked to a raft (not shown), to which raft a part can be adhered, bonded, or otherwise secured.

In an example operation, particulate material can be communicated from supply 118 onto first support substrate 116, which first support substrate can be a clear (or relatively clear) bottom layer, e.g., a layer of glass, plastic, mineral (e.g., sapphire), and the like. The first support substrate 116 need not necessarily be optically clear, and can be selected based on its transparency to a particular illumination of interest.

The particulate 124 can be communicated via, e.g., a brush, roller, or blade 126; particulate can be advanced by a piston 114 or other device so as to place the particulate into position for communication into the first support substrate. A reservoir 108 can also provide additional particulate. As shown, supply 118 can be a container in which the unused particulate is held, and reservoir 108 can be a container (e.g., a box, a frame, and the like) that holds the particulate on top of the first support substrate 116; reservoir 108 is not a requirement but can be useful in some instances. A vibration source 106 can be used to effect leveling/settlement of particulate material that has been communicated to the first support substrate.

Illumination 110 (which can be blue laser illumination, but can also be other forms of laser illumination or still other forms of radiation) can be directed from illumination source 112 (which can include, e.g., a laser source and/or galvo mirrors) toward and through first support substrate 116 so as to effect at least partial solidification (e.g., sintering) of particulate material 124 supported by the first support substrate so as to form a first fused region of the particulate material and, in turn, a part 104 that is formed of fused particulate. Illumination 110 can be projected according to a pattern (e.g., a circular pattern, a spiral pattern, and the like) so as to effect solidification of the particulate material in accordance with that pattern.

Following formation of a fused region, print tray 102 can be moved so as to lift the part that is attached to the print tray so as to create a space between the fused region that was formed and the first support substrate. Particulate material remaining on the first support substrate can be collected and, e.g., recycled. An additional amount of particulate material can then be communicated onto the first support substrate, following which illumination can be applied to form a second fused region of particulate material, which second fused region can be fused, e.g., via heating, via illumination) to the previously-formed first fused region. As described elsewhere herein, a support substrate (e.g., bottom layer 116) and a print head can be configured for motion relative to one another, e.g., one or both can be moveable relative to the other.

System 10 can include a station 120, which station can include, e.g., a cleaning train (e.g., a fluid jet to clean excess particulate material), and can also include one or more optical modules, such as cameras or other imagers, used for part inspection. Part inspection can be performed as a part is being constructed layer-by-layer. In this way, one can monitor the progress and structure of a part in real-time (or in near-real-time), and can even modify a fabrication sequence so as to address issues that may arise during fabrication, before a part is completed. As an example, if the formation of a gap is registered in a part, a system can be configured to deploy particulate matter and illumination so as to fill in the gap.

Print tray movement system 100 can be used to move moveable print tray 102 from a position where the tray is in register with first support substrate 116 to a position where the tray is in register with a second support substrate 116a. At that location, particulate material 124a can be communicated to the second support substrate from supply 118a onto second support substrate 116a. Illumination 110a can be supplied from illumination source 112a toward and through toward and through second support substrate 116s so as to effect at least partial solidification (e.g., sintering) of particulate material 124a supported by the second support substrate so as to form a second fused region of the particulate material, which second fused region can be fused to part 104. Illumination 112a can be projected according to a pattern (e.g., a circular pattern, a spiral pattern, and the like) so as to effect solidification of the particulate material in accordance with that pattern. Particulate 124a can be settled/leveled by vibration source 106a. A system can include one or more optical modules (114, 122) that can be configured to inspect parts being formed and/or system components.

Figure 2:
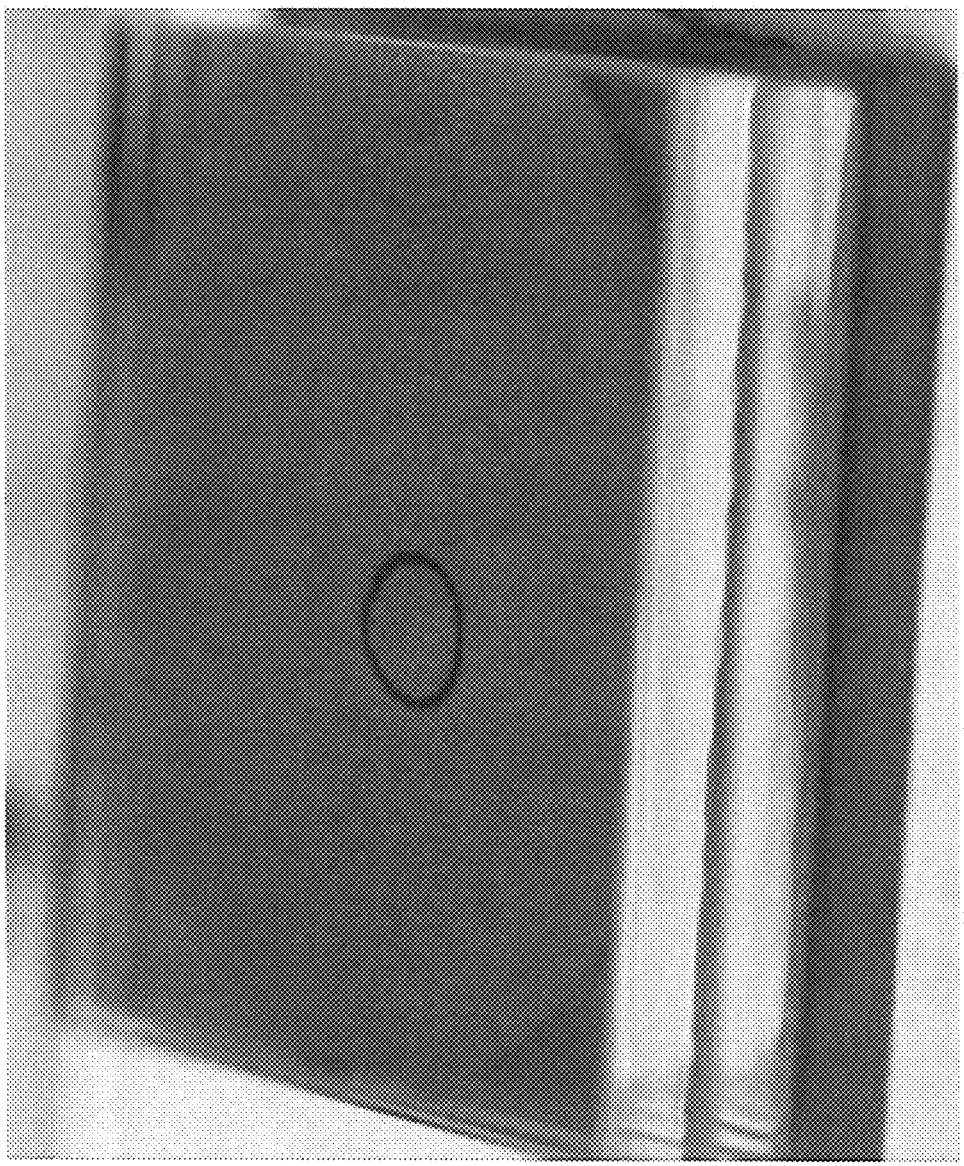
FIG. 2 provides an exemplary sintered ring formed according to the present disclosure.

FIG. 2 provides an exemplary sintered ring formed according to the present disclosure. As shown, the ring (dark) is formed within a layer of particulate (lighter), with illumination being projected through a glass substrate in a ring-shaped pattern.

Figure 3:
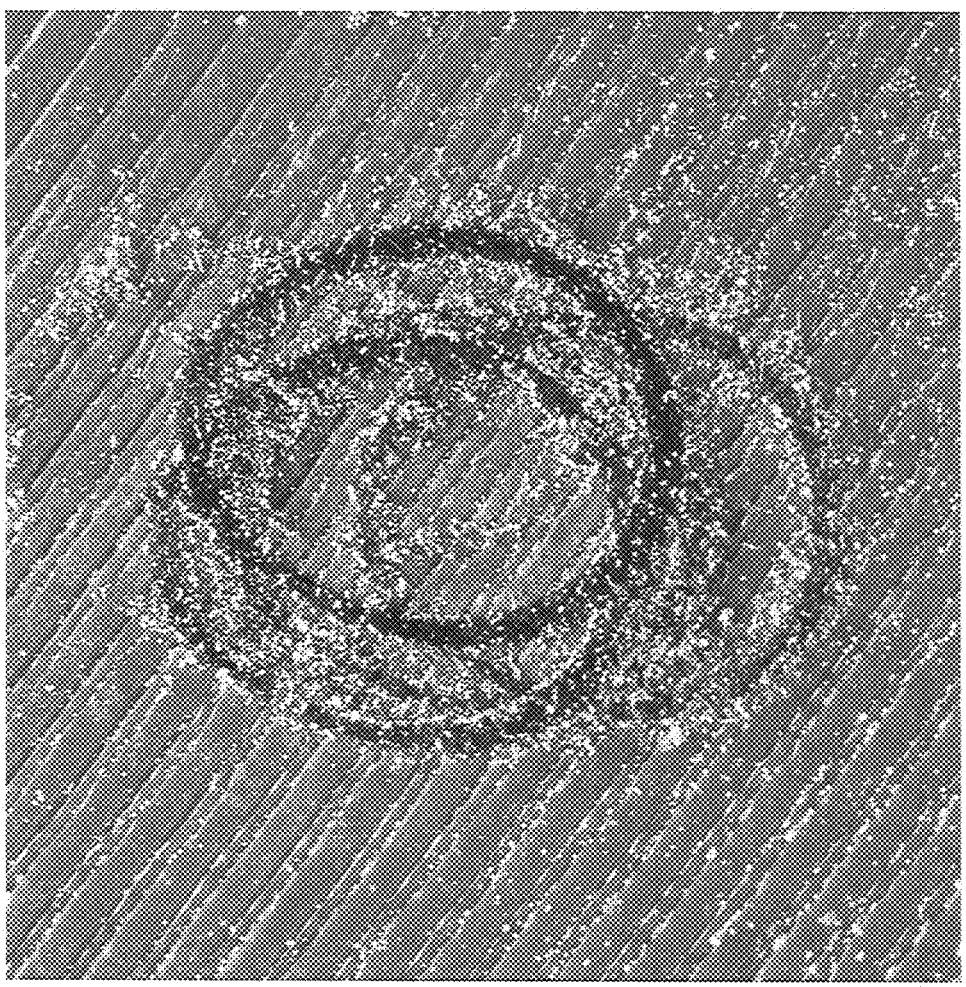
FIG. 3 provides sintered rings made according to the present disclosure and sintered to a polylactic acid (PLA) raft.

FIG. 3 provides sintered rings made according to the present disclosure and sintered to a polylactic acid (PLA) raft.

Figure 4:
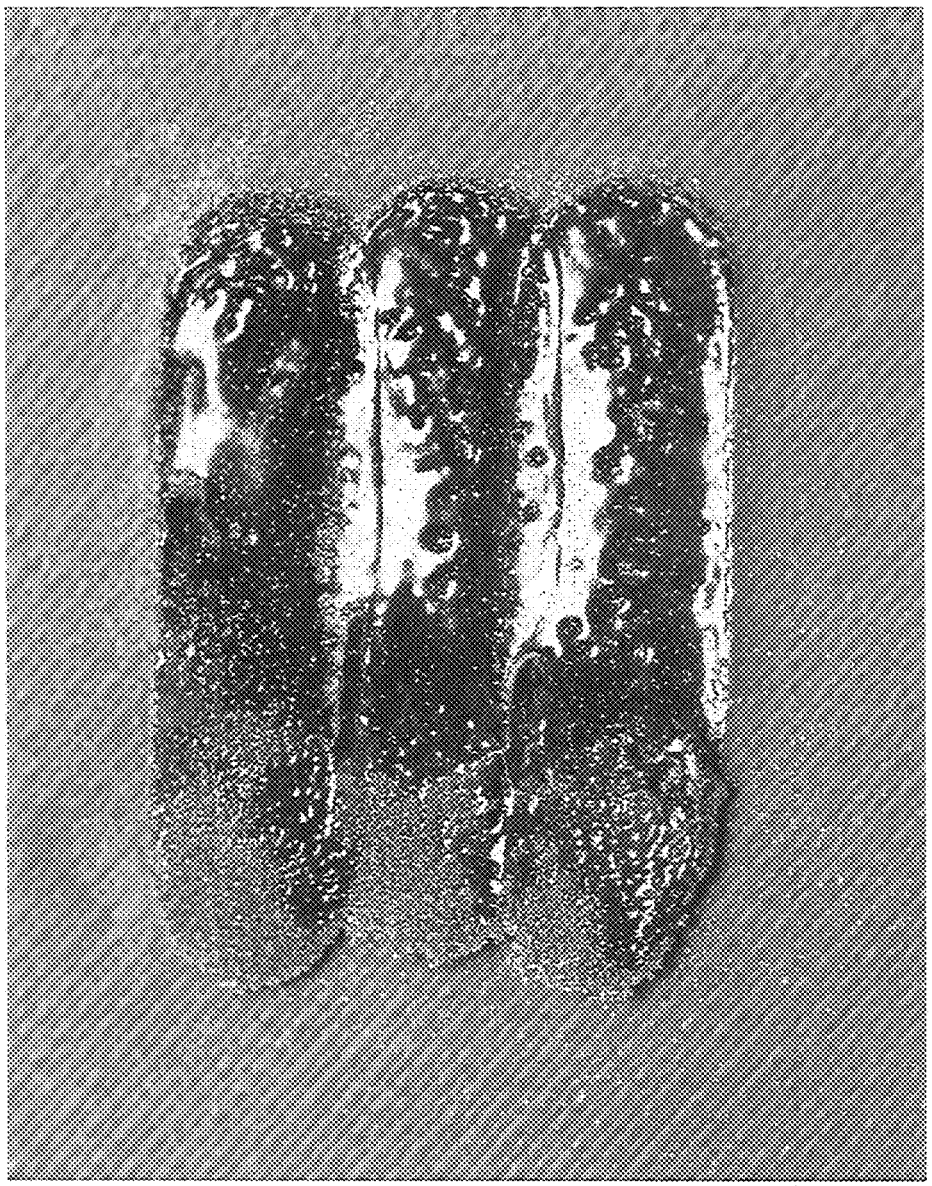
FIG. 4 provides exemplary solid sintered material on a PLA raft.

FIG. 4 provides exemplary solid sintered material on a PLA raft; as shown, the sintered material is present in first, second, and third oblong regions, with the first and third sintered regions each being fused to the second region.

Figure 5:
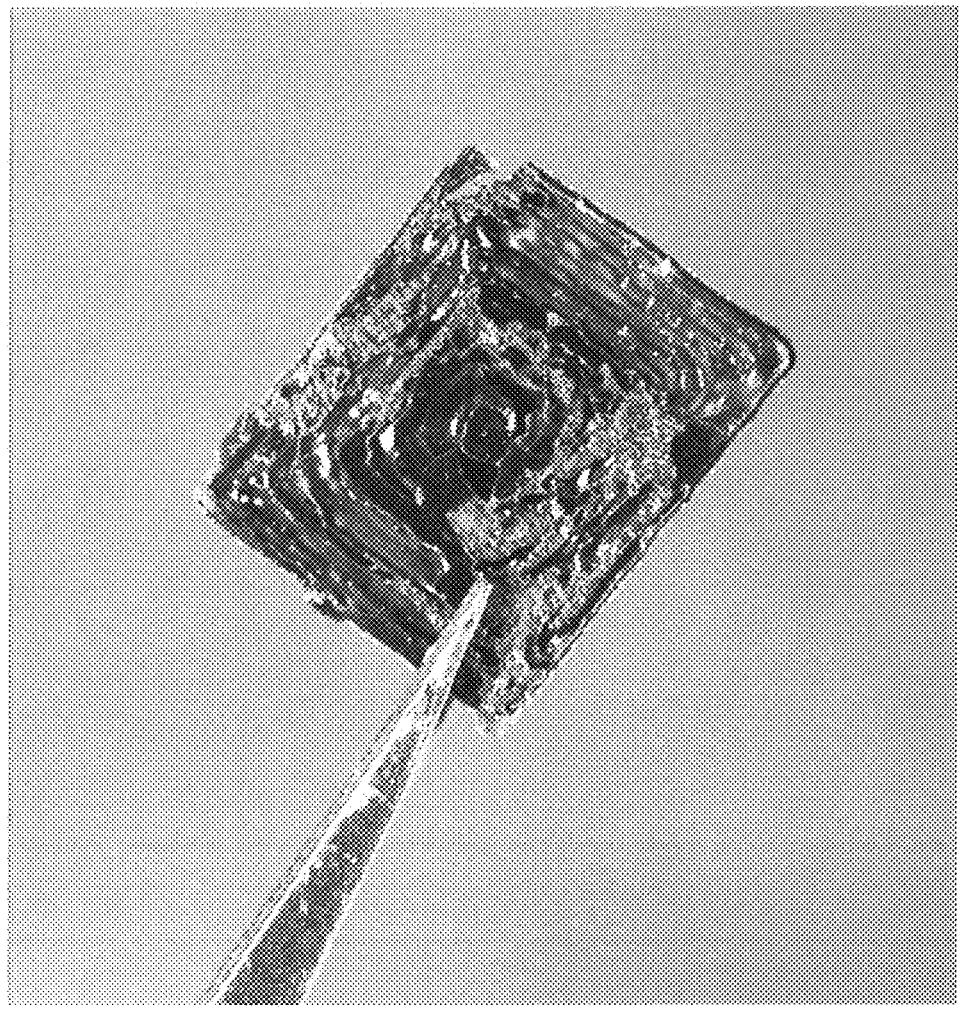
FIG. 5 provides a sintered part (rectangular in shape) following formation according to the present disclosure.

FIG. 5 provides a sintered part (rectangular in shape) following formation according to the present disclosure. As shown, the part is formed in a spiral configuration, in which the illumination source provided illumination in a spiral shape.

Figure 6:
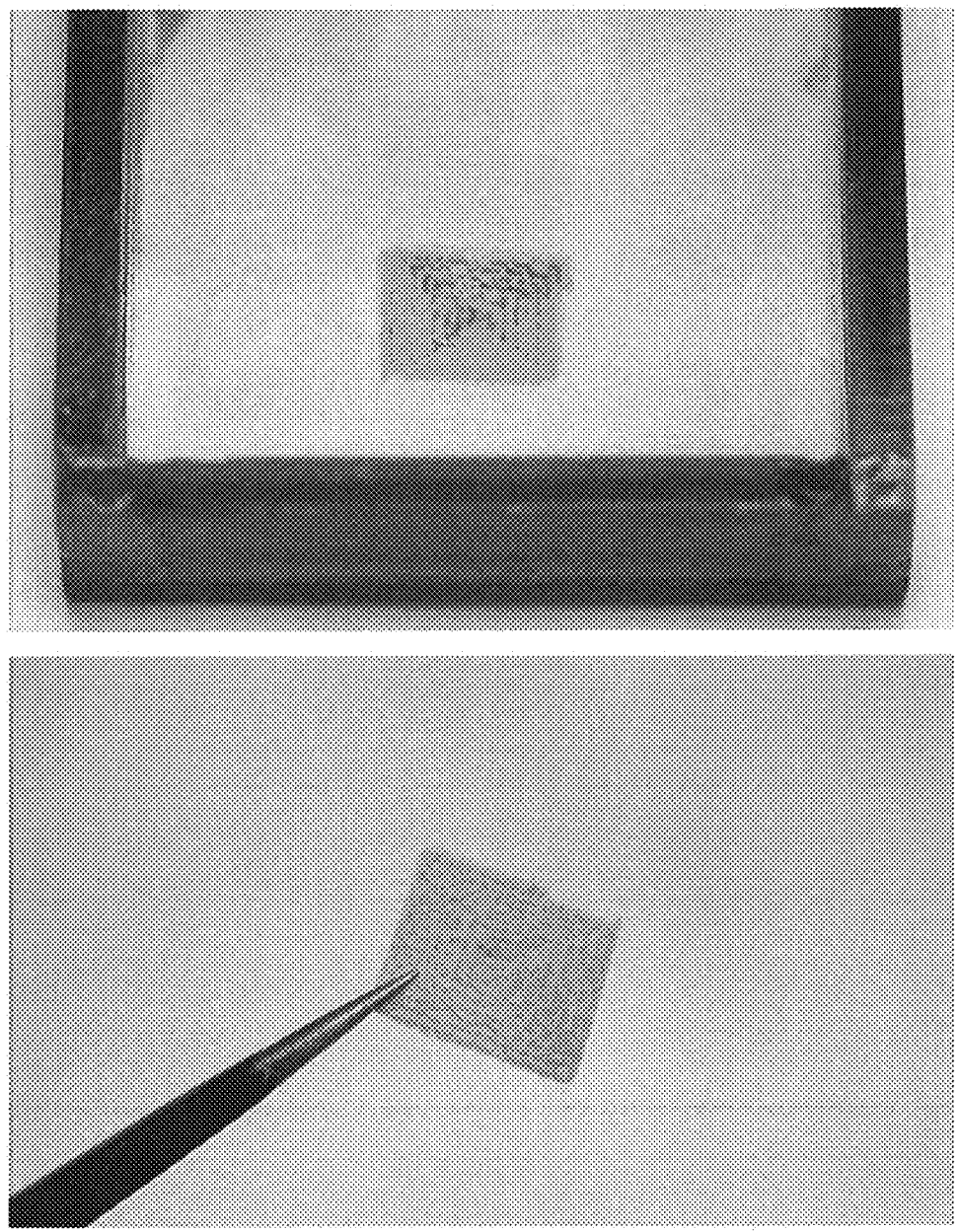
FIG. 6 provides an illustration of an example part formed according to the present disclosure on a glass substrate (top panel) and following removal from the glass substrate (bottom panel)

FIG. 6 provides an illustration of an example part formed according to the present disclosure on a glass substrate (top panel) and following removal from the glass substrate (bottom panel).

Figure 7:
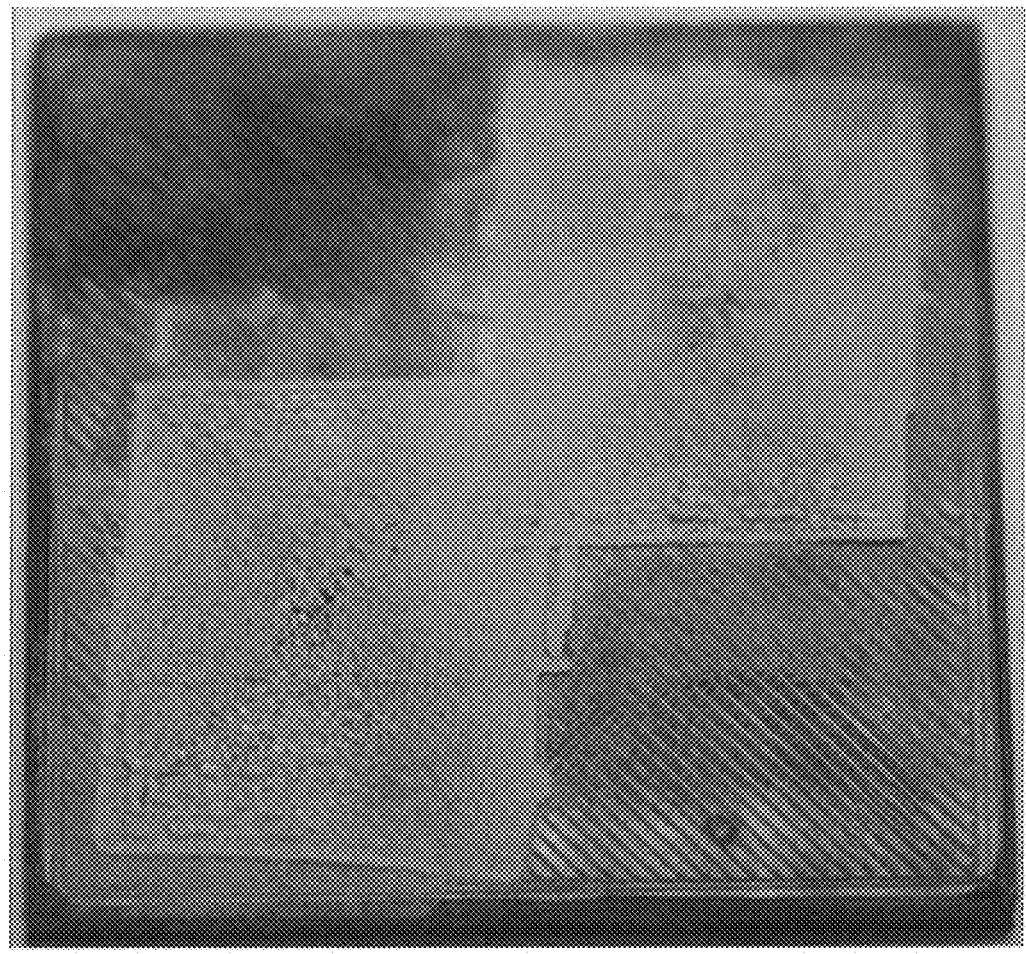
FIG. 7 provides an illustration of two opposing "corners" of a checkerboard pattern formed with thermoplastic urethane (TPU) according to the present disclosure.

FIG. 7 provides an illustration of two opposing "corners" of a checkerboard pattern formed with thermoplastic urethane (TPU) according to the present disclosure. As shown, the two "corners" can be fused to one another.

Figure 8:
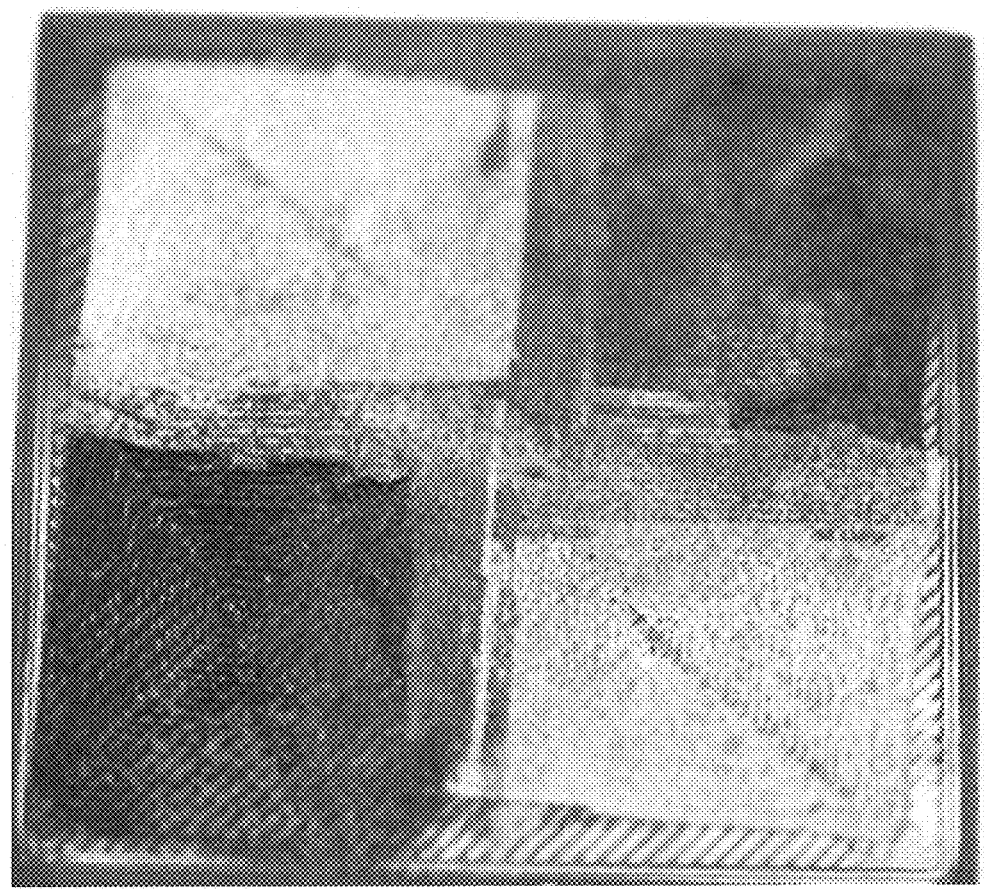
FIG. 8 provides the two opposing squares of the TPU material from FIG. 7, but with fused nylon material formed in the two remaining corners.

FIG. 8 provides the two opposing squares of the TPU material from FIG. 7, but with fused nylon material formed in the two remaining corners. As shown, the disclosed technology is thus capable of forming a single cohesive layer, with regions of that layer in turn being formed of different particulate materials.

Figure 9:
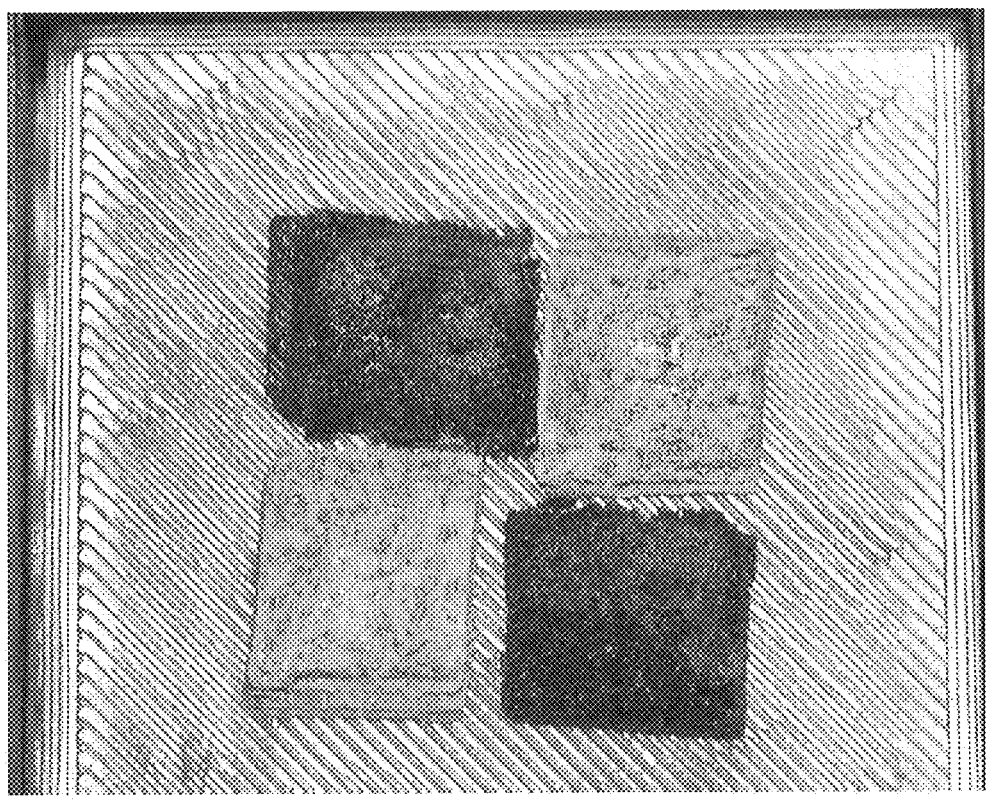
FIG. 9 provides an alternative "checkerboard" patterns formed with opposing squares made of different materials (TPU and nylon)

FIG. 9 provides an alternative "checkerboard" pattern formed with opposing squares made of different materials (TPU and nylon). This again illustrates the ability of the disclosed technology to form parts in a layer-by-layer fashion, with individual cohesive layers in turn having regions formed of different particulate materials. This allows a user to exert exceptional control over the mechanical, degradative, and other properties of additively-manufactured parts, as a user can construct a part such that certain layers (or even certain regions of certain layers) have mechanical or other properties that are different from those of other layers or of other regions of other layers. An individual layer can include one, two, three, or more regions, each region differing in one or more characteristics from other regions of the layer.

Figure 10:
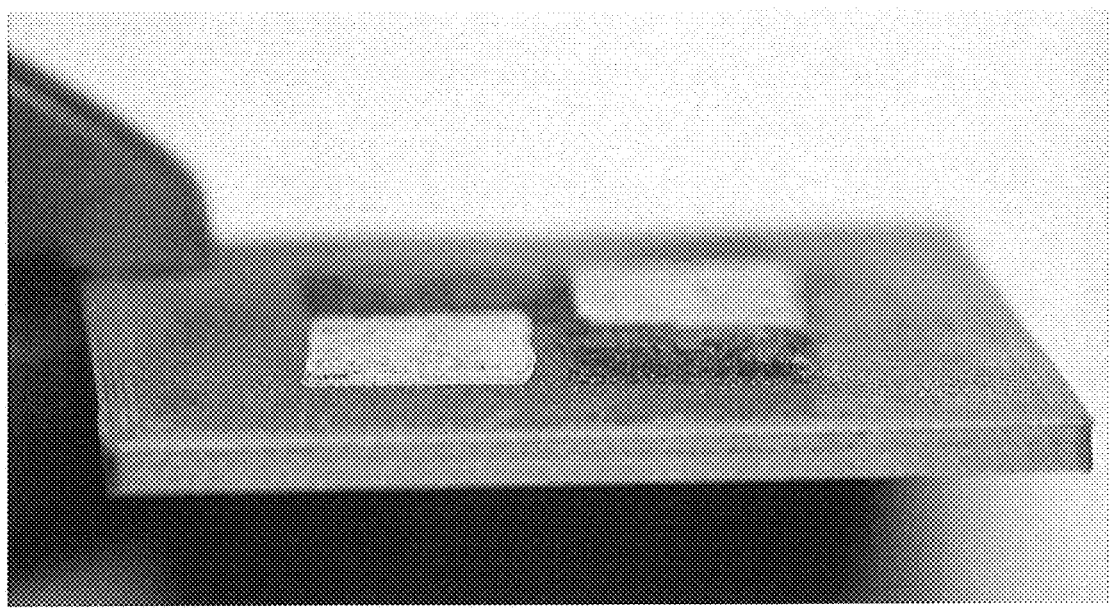
FIG. 10 provides a view of the "checkerboard" pattern of FIG. 9, taken from an alternative side angle.

FIG. 10 provides a view of the "checkerboard" pattern of FIG. 9, taken from an alternative side angle.

Figure 11:
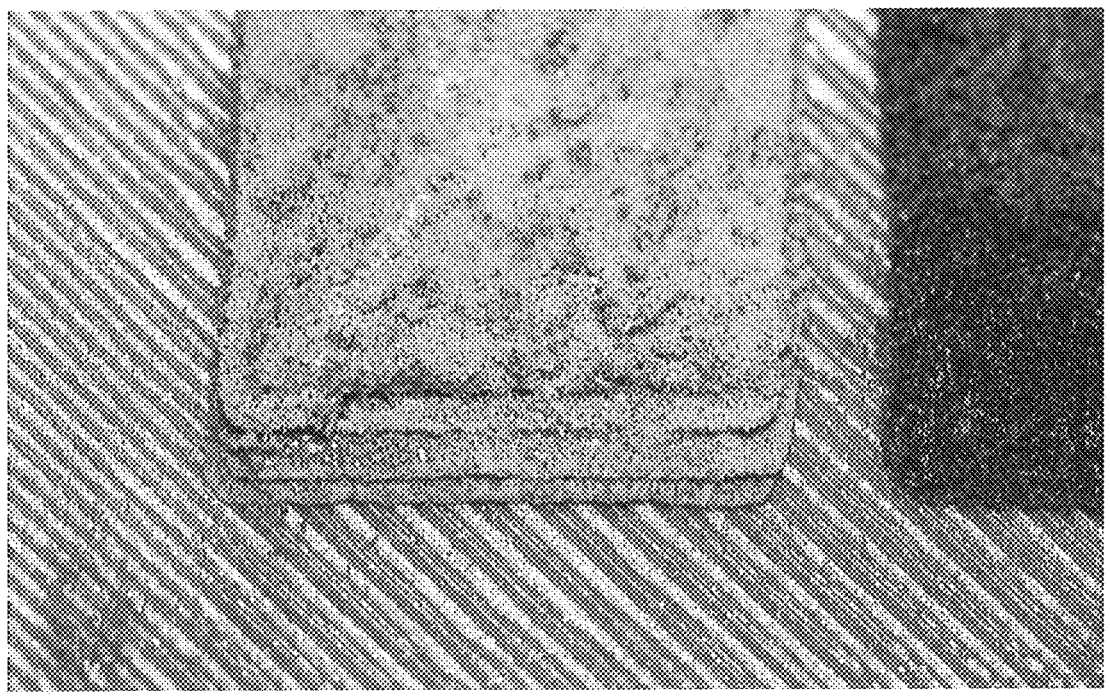
FIG. 11 provides a close-up view of one of the squares of the "checkerboard" pattern of FIG. 9 and FIG. 10.

FIG. 11 provides a close-up view of one of the squares of the "checkerboard" pattern of FIG. 9 and FIG. 10.

FIG. 12A, FIG. 12B, FIG. 12C, FIG. 12D, FIG. 12E, and FIG. 12F illustrate an exemplary fabrication sequence according to the disclosed technology performed so as to fabricate a layered part that has different materials in different layers. As shown, part 104 can be contacted with particulate material 124. Particulate material 124 can then be illuminated by illumination 110, which illumination can be, e.g., a laser, a UV source, and the like. Illumination 110 can then give rise to a solidified region 124s of particulate 124. Solidified region 124s can be solid, but can also be porous. As shown, part 104 (with solidified region 124s attached) can be lifted away from the remaining particulate material 124 and support substrate 116.

A second particulate material 130 can then be applied to support substrate 116. Second particulate material 130 can be the same as first particulate material 124, but second particulate material 130 can also be different from particulate 124 in terms of particulate size, particulate composition, or other characteristics. Part 104 with solidified region 124a can be lowered, and illumination 110 can be used to give rise to a solidified region 130s of second particulate material 130.

Solidified region 130a can be bound to solidified region 124a, as shown. Part 104 (with solidified regions 124s and 130s) can be lifted away from particulate material 130 and support substrate 116. In this way, the disclosed technology can be used to form parts having different layers made of different materials. As explained elsewhere herein, a release agent (not shown) can be disposed between the support substrate 116 and particulate material supported by the substrate. (As an example, the release agent can be applied to the substrate, and the particulate material can then be disposed onto the release agent.) It should be understood that although solidified region 124a is shown as attached to part 104, a solidified region can also be attached directly to a print tray, i.e., an object that is not itself additively manufactured. For example, solidified region 124a can be the first layer of an additively-manufactured part, with the first layer being attached to a print tray.

FIG. 13A, FIG. 13B, FIG. 13C, FIG. 13D, FIG. 13E, and FIG. 13F illustrate an exemplary fabrication sequence according to the disclosed technology so as to form layers that have sub-regions formed from different materials. As shown, part 104 can be contacted with first particulate material 124 and second particulate material 130. First particulate material 124 and second particulate material 130 scan then be illuminated by illumination 110, which illumination can be, e.g., a laser, a UV source, and the like. Illumination 110 can then give rise to a solidified regions 124s and 130s of first particulate 124 and second particulate 130, respectively. Solidified regions 124s and 130s can be solid, but can also be porous. As shown, part 104 (with solidified regions 124s and 130s attached) can be lifted away from the remaining first particulate material 124, second particulate material 130, and support substrate 116. In this way, the disclosed technology can be used to form parts having different materials present in the same layer.

A third particulate material 140 can then be applied to support substrate 116. Third particulate material 140 can be the same as first particulate material 124 or second particulate material 130, but can also be different in terms of particulate size, particulate composition, or other characteristics. Part 104 with solidified region 124a can be lowered, and illumination 110 can be used to give rise to a solidified region 130s of second particulate material 130. The solidified region 130a can be bound to solidified region 124a, as shown.

Part 104 (with solidified regions 124s and 130s) can be lifted away from particulate material 130 and support substrate 116. As explained elsewhere herein, a release agent (not shown) can be disposed between the support substrate 116 and particulate material supported by the substrate.

FIG. 14A, FIG. 14B, FIG. 14C, FIG. 14D, FIG. 14E, and FIG. 14F illustrate an exemplary embodiment of the disclosed inverted sintering process. As shown, a release agent 150 can be disposed on support substrate 116. Without being bound to any particular theory or embodiment, the release agent can be a material that reduces or eliminates "sticking" between the particulate matter and the support substrate. Particulate material 124 can then be disposed atop the release agent. A substrate 160 (which can be a part additively-manufactured from previous layers) is then placed into contact with the substrate, and illumination 110 is used to give rise to a solidified region 124s of particulate material 124s.

Substrate 160 and solidified region 124s are then translated away from unfused particulate material 124 and support substrate 116. Additional particulate material (as well as additional release agent, if warranted) can then be applied to support substrate 116, and substrate 160 and solidified region 124s can be lowered such that solidified region 124s contacts the applied additional particulate matter, and the process can be repeated in a step-wise fashion so as to additively fabricate a part. As described herein, a given layer can comprise one, two, or more types of particulate material, and adjacent layers can comprise the same particulate materials or different particulate materials. FIG. 14G illustrates a multi-material sample generated with this process.

Figures 15A, 15B:
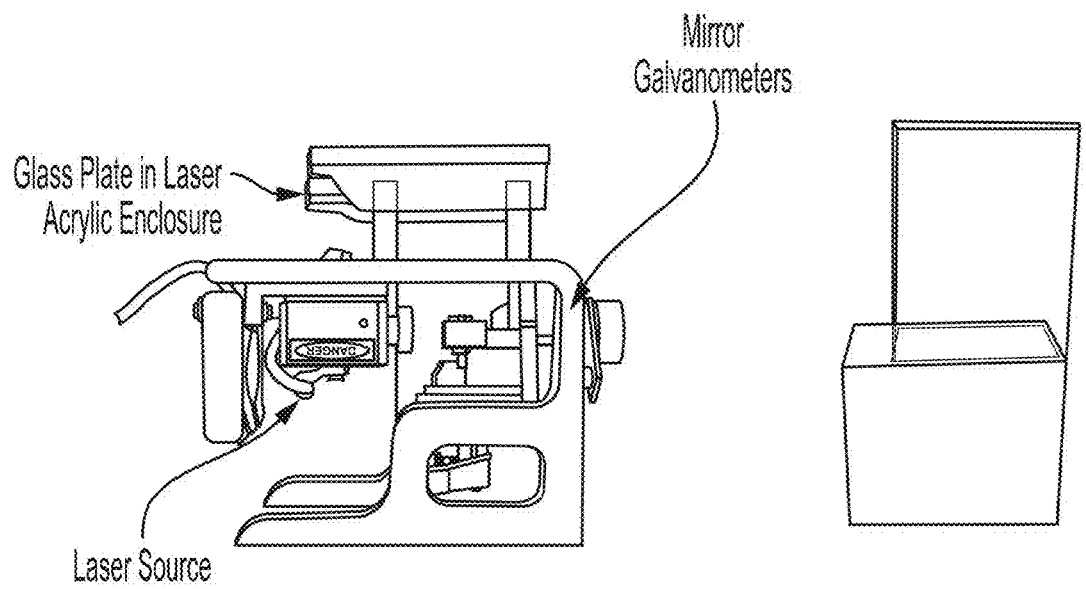
FIG. 15A provides an exemplary inverted laser setup attached to a 3D printed mount, FIG. 15B provides an example laser-opaque containment unit, and FIG. 15C provides a laser in its operating state without the containment unit in place showing the beam directed up into a glass piece.
Figure 15C:
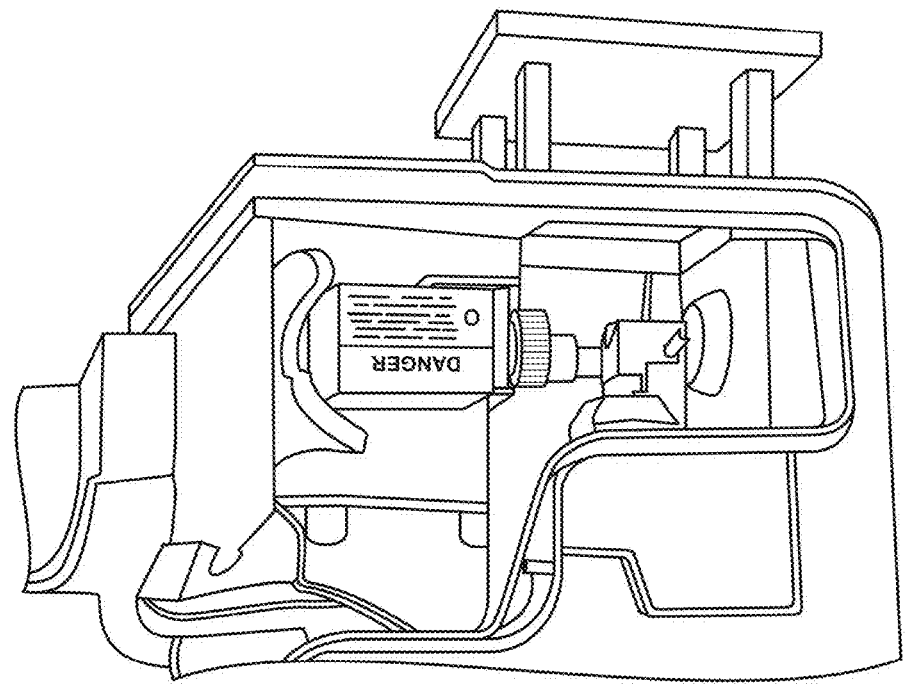

FIG. 15A provides an example inverted laser setup attached to a 3D printed mount. FIG. 15B provides a laser-opaque containment unit. FIG. 15C provides a laser in its operating state without the containment unit in place, showing the beam directed up into a glass support substrate.

FIG. 16 provides an illustrative diagram of laser refraction, showing beam refraction through a glass substrate.

FIG. 17 provides a spiral sintering pattern diagram, parameter a is the spacing between consecutive spirals, and parameter b is the laser propagation speed. Sintering starts at the red dot and ends at the blue.

Figure 18A:
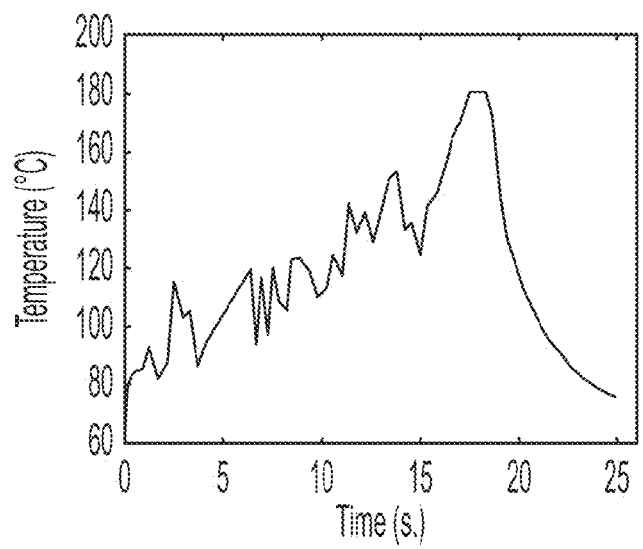
FIG. 18A provides maximum temperatures recorded during the sintering spiral pattern with nylon sintering, FIG. 18B provides maximum temperatures recorded during the sintering spiral pattern with TPU sintering, and FIG. 18C provides maximum temperatures recorded during the sintering spiral pattern with a picture showing an example heating profile during sintering.
Figure 18B:
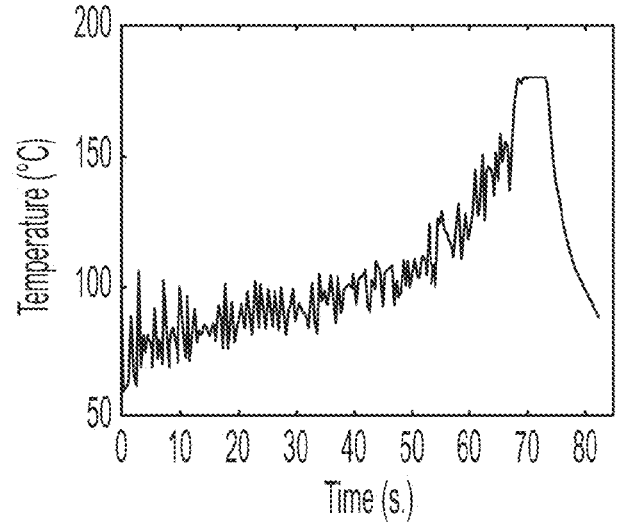
Figure 18C:
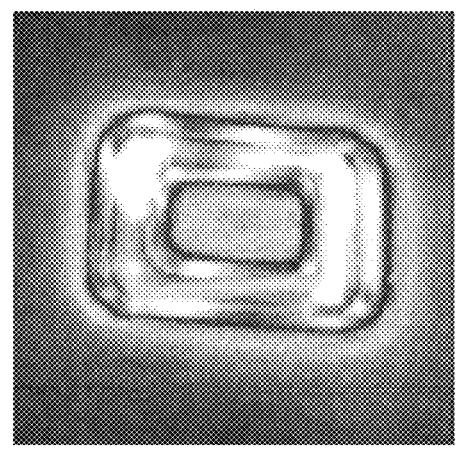

FIG. 18A provides maximum temperatures recorded during the sintering spiral pattern with Nylon sintering. FIG. 18B provides maximum temperatures recorded during the sintering spiral pattern with TPU sintering, and FIG. 18C provides a picture showing the sample heating profile during sintering.

Figure 19A:
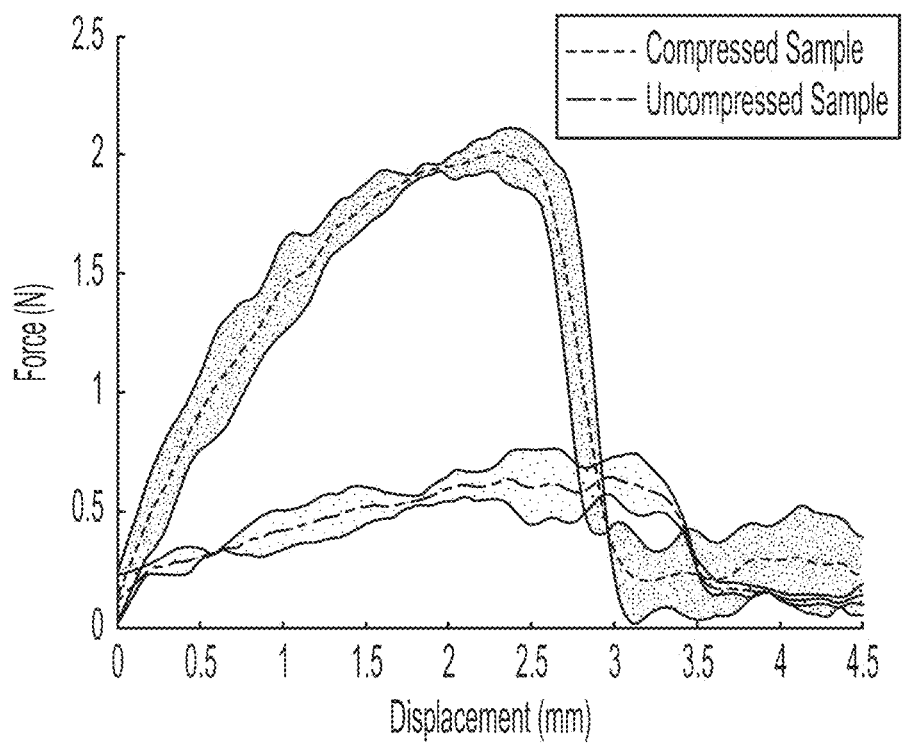
FIG. 19A provides force displacement evaluation for loaded and unloaded samples with force-displacement curves for loaded and unloaded samples, and FIG. 19B provides the upper surface of an unloaded evaluation sample.
Figure 19B:
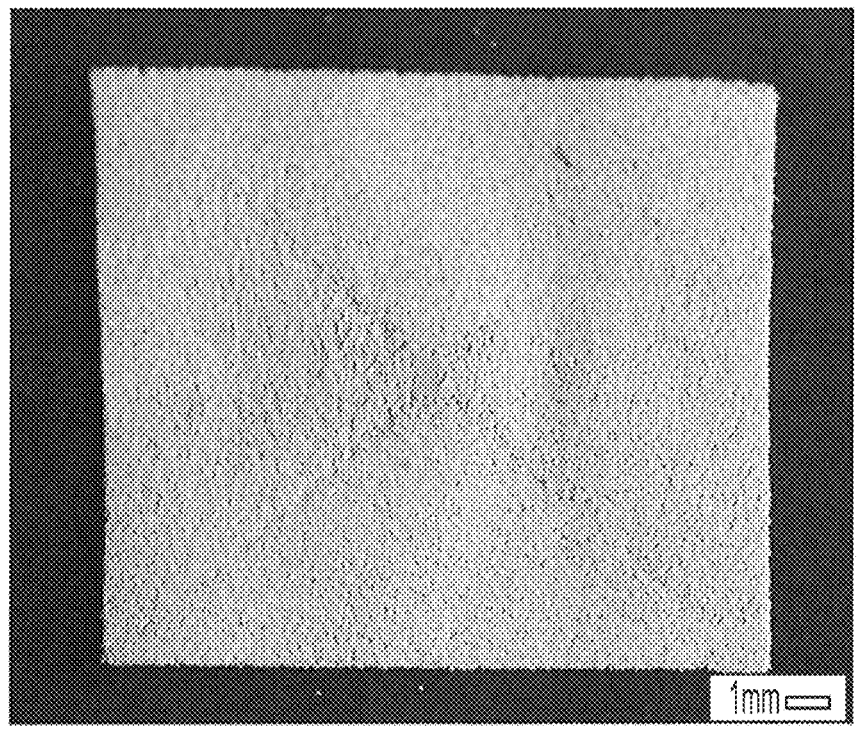

FIG. 19A provides force displacement evaluation for loaded and unloaded samples with force-displacement curves for loaded and unloaded samples, and FIG. 19B provides the upper surface of unloaded evaluation sample FIG. 20A provides an image of the laser affected material with loaded sample side in contact with glass. FIG. 20B provides an image of the unloaded sample side in contact with glass. FIG. 20C provides a cross sectional view of the loaded sample. FIG. 20D provides a cross sectional view of the unloaded sample.

FIG. 21 provides force displacement evaluation for agent affected and unaffected samples.

FIG. 22 provides an inverted multi-material sintering pattern on an acrylic raft with (a) top view, and (b) profile view.

Figure 23:
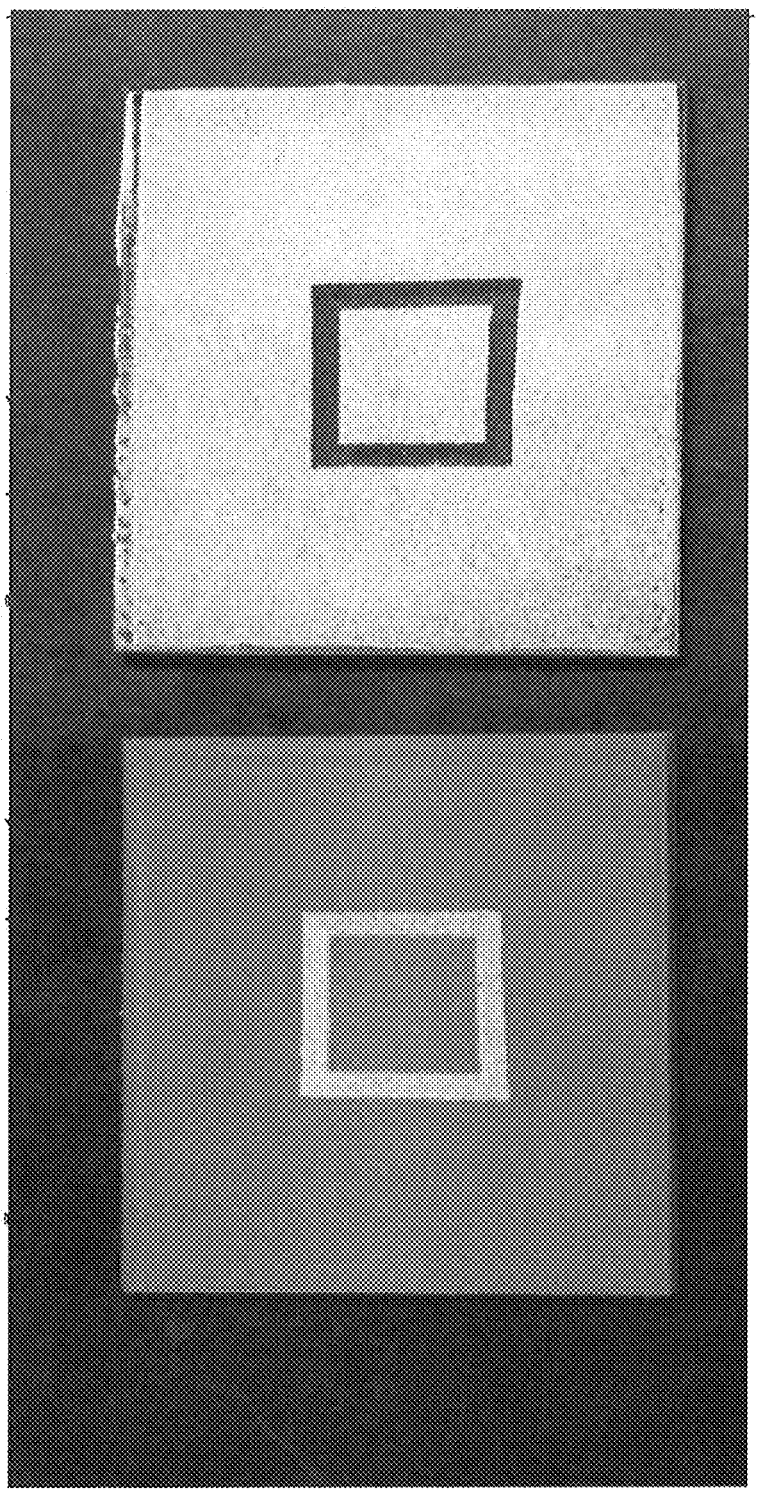
FIG. 23 provides an image generated using the inverted SLS setup and the incorporation of the release agent process described in this disclosure. As shown, substrate (orange)

FIG. 23 provides an image generated using the inverted SLS setup and the incorporation of the release agent process described in this disclosure. As shown, substrate (orange) was removed from the material coated glass (white and clear), and the white material was distributed in an even, homogenous layer.

FIG. 24A, FIG. 24B, FIG. 24C, FIG. 24D, FIG. 24E, FIG. 24F, FIG. 24G, FIG. 24H, and FIG. 24I illustrate an exemplary fabrication sequence according to the disclosed technology. As shown, a release agent 150 can be disposed on support substrate 116. Without being bound to any particular theory or embodiment, the release agent can be a material that reduces or eliminates "sticking" between the particulate matter and the support substrate. Particulate material 124 can then be disposed atop the release agent. A substrate 160 (which can be a part additively-manufactured from previous layers) is then placed into contact with the substrate, and illumination 110 is used to give rise to a solidified region 124s of particulate material 124s. Substrate 160 and solidified region 124s are then translated away from unfused particulate material 124 and support substrate 116.

Solidified region 124s can then be at least partially immersed in curable resin 180, which resin can be located in vessel 182. Solidified region 124s can be immersed in resin 180 under conditions (and a duration) such that resin 180 infiltrates solidified region 124s. Illumination 110c can then be used to cure at least some of resin 180 so as to give rise to a composite region 124c that comprises solidified particulate matter and cured resin. Without being bound to any particular theory, this allows a user to form layers (and, in turn, parts) that incorporate two or more materials, thus allowing for tunable properties.

FIG. 25A, FIG. 25B, FIG. 25C, FIG. 25D, FIG. 25E, FIG. 25F, FIG. 25G, and FIG. 25H illustrate an exemplary fabrication sequence according to the disclosed technology. As shown, a release agent 150 can be disposed on support substrate 116. Without being bound to any particular theory or embodiment, the release agent can be a material that reduces or eliminates "sticking" between the particulate matter and the support substrate. Particulate material 124 can then be disposed atop the release agent. A substrate 160 (which can be a part additively-manufactured from previous layers) is then placed into contact with the substrate, and illumination 110 is used to give rise to a solidified region 124s of particulate material 124s. Substrate 160 and solidified region 124s are then translated away from unfused particulate material 124 and support substrate 116.

Solidified region 124s can then be contacted to a layer of curable resin 180. It should be Illumination 110c can be used to cure resin disposed about solidified region 124s so as to give rise to cured resin 180a disposed about solidified region 124s. Without being bound to any particular theory, this allows a user to form layers (and, in turn, parts) that incorporate two or more materials, thus allowing for tunable properties.

As an example, a solidified region made from fused (sintered) particulate material can be sealed within a shell or channel of cured resin. In this way, one can form conductive paths (via fusing metallic particulate). These conductive paths can then in turn be sealed within cured resin, which cured resin can be an insulator.

EXEMPLARY EMBODIMENTS

The following non-limiting embodiments are illustrative of the disclosed technology. These embodiments, however, do not serve to limit the scope of the present disclosure, including the scope of the attached claims.

Embodiment 1

An additive manufacturing system, comprising: a first support substrate having a first side and a second side, the first support substrate being at least partially transparent to an illumination, and the first side of the first support substrate being configured to support a particulate material such that the particulate material is exposed to the illumination; a first illumination train configured to project the illumination toward the second side of the first support substrate such that the illumination passes through the substrate so as to illuminate the particulate material, the first illumination train optionally being configured to project the illumination in accordance with a preprogrammed pattern; and a print head, the print head being configured to translate a fused region formed from particulate material supported by the first side of the first support substrate in a direction away from the first side of the first support substrate.

It should be understood that a system can be configured to effect relative motion between the fused region and the first support substrate. As an example, a print head can remain stationary (with a fused region attached to the print head), and the first support substrate can be moved away from the print head (and fused region). One or both of the print head and the first support substrate can be capable of (and/or configured to effect) motion relative to the other.

A support substrate can comprise, e.g., glass, a polymer, a mineral, and the like. A substrate can be cooled, e.g., via fluid (air, coolant) flow, via a heat exchanger (e.g., fins), and the like. The first supporting substrate can be oriented such that it is perpendicular to gravity.

Particulate material can be a polymeric material, e.g., a thermoplastic (nylon, TPU, PLA), glass, a metal (e.g., titanium, stainless steel), a ceramic, and the like. A particulate material can comprise one or more metals, and can comprise an alloy, and oxide, and the like. The selection of particulate can depend on the material used for the support substrate and the temperature that can be attained by the system.

Particulate material can be as a layer of single-particle thickness, but this is not a requirement, as particulate can be present in a layer that is multiple particles in thickness. Particulate can be present atop a support substrate at a thickness of from about 0.05 mm to about 1 mm, or from about 0.05 mm to about 0.15 mm, or even at about 0.1 mm.

Embodiment 2

The additive manufacturing system of Embodiment 1, wherein the direction is parallel to and against gravity.

Embodiment 3

The additive manufacturing system of any one of Embodiments 1-2, wherein the print head is in register with the first side of the first support substrate.

Embodiment 4

The additive manufacturing system of any one of Embodiments 1-3, wherein the print head is configured to translate the fused region in a direction parallel to the first side of the first support substrate. This can be accomplished via linear motion; a print head can also be configured to rotate between positions such that each position is in register with a support substrate. As an example, a system can be configured such that, looking down on the system from above, support substrates are located at the 3- and 9-o'clock positions, and the print head moves in a circular/rotational (e.g., circumferential) fashion so as to carry a part from the support substrate at 3-o'clock to the support substrate at the 9-o'clock location.

Embodiment 5

The additive manufacturing system of any one of Embodiments 1-4, further comprising (a) a first particulate dispensing train configured to dispense a first particulate material such that the first particulate material is supported by the first side of the first support substrate (e.g., dispensing the first particulate material onto the first side of the first support substrate, or dispensing the first particulate material onto a release agent that is disposed on or supported by the first side of the first support substrate), (b) a first release agent dispensing train configured to dispense a release agent onto the first side of the first support substrate, or both (a) and (b).

A release agent dispensing train can also be configured to dispense release agent onto a particulate material that is supported by a substrate. As an example, a release agent dispensing train can be configured to dispense release agent onto a layer of first particulate material that is itself supported by the first support substrate.

A particulate dispensing train can include, e.g., a piston/platform that advances particulate, a spreader (e.g., a brush, a blade, and the like). A release agent dispensing train can include, e.g., a sprayer, a spreader, and the like.

Suitable release agents include, e.g., water-soluble materials, although silicone-based release agents can also be used. Example, non-limiting release agents include, e.g., SLIDE™ water soluble mold release agent (https://www.slideproducts.com/water-soluble-mold-release-agent-no-41212n.html), Sprayon Heavy-Duty Mold Release™ (https://www.mscdirect.com/product/details/84253004?rItem=84253004), CRC Boron Nitride Mold Release™ (https://www.zoro.com/crc-boron-nitride-mold-release-16 oz-03310/i/G1553675/feature-product?gclid=EAIaIQobChMImPuDzv625wIVAo7ICh3i8w95EAkYAiABEgKr8vD_BwE), and the like. It should be understood that a release agent need not be water soluble or silicone-based, and a variety of release agents can be used. A mold release agent can be recovered/recycled, if desired.

A release agent can be present in a thin layer (e.g., less than 1 mm thick, e.g., less than about 1000 micrometers, or less than about 700 micrometers, or less than about 500 micrometers, or less than about 400 micrometers, or even less than 100 micrometers, or less than about 50 micrometers, or less than about 40 micrometers, or less than about 30 micrometers, or less than about 20 micrometers, or less than about 10 micrometers, or less than about 5 micrometers, or even less than about 2 or even about 1 micrometer), but can also be present in a thicker layer. It is not a requirement that the release agent be present so as to completely submerge the particulate matter. A release agent can be transparent, but this is not a requirement. A release agent can be in a fluid or "wet" state. A release agent can be removed (e.g., via heating, application of reduced pressure, or other techniques) after use; release agent can be removed from a fused region of a part and/or from the support substrate. Recovered release agent can be recycled/reused.

Embodiment 6

The additive manufacturing system of Embodiment 5, further comprising a second particulate dispensing train configured to dispense a second particulate material such that the second particulate material is supported by the first side of the first support substrate, e.g., dispensing the second particulate material onto the first side of the first support substrate, or dispensing the second particulate material onto a release agent that is disposed on or supported by the first side of the first support substrate. In this way, a user can have different particulates supported by the first substrate, thereby allowing for construction of layered parts in which successive layers are formed from different particulates, as shown in FIG. 12 and FIG. 13.

Embodiment 7

The additive manufacturing system of any one of Embodiments 1-6, further comprising a vibration source configured to vibrate particulate material supported by the first side of the first support substrate.

Embodiment 8

The additive manufacturing system of any one of Embodiments 1-7, further comprising: a second support substrate defining a first side and a second side, the second support substrate being at least partially transparent to an illumination, and the first side of the second support substrate being configured to support a particulate material such that the particulate material is exposed to the illumination.

Embodiment 9

The additive manufacturing system of Embodiment 8, further comprising (a) a second particulate dispensing train configured to dispense a second particulate material such that the second particulate material is supported by the first side of the second support substrate (e.g., dispensing the second particulate material onto the first side of the second support substrate, or dispensing the first particulate material onto a release agent that is disposed on or supported by the second side of the first support substrate), (b) a second release agent dispensing train configured to dispense a release agent onto the first side of the second support substrate, or both (a) and (b). Suitable release agents are described elsewhere herein.

Embodiment 10

The additive manufacturing system of any one of Embodiments 8-9, wherein the first illumination train is configured to project the illumination at the second side of the second support substrate. The first illumination train can be located directly beneath or in register with the first support substrate, but this is not a rule or requirement, as illumination from the first illumination train can be projected toward the support substrate using mirrors, optical fibers, and the like.

Embodiment 11

The additive manufacturing system of any one of Embodiments 8-9, further comprising a second illumination train, the second illumination train being configured to project an illumination at the second side of the second support substrate.

Embodiment 12

The additive manufacturing system of any one of Embodiments 1-10, wherein the print head is configured for attachment to the fused region. Attachment can be accomplished in a number of ways, e.g., via adhesive, sintering, and the like. In some embodiments, attachment can be effected by forming a dummy or sacrificial fused region that is attached directly to the print head (and/or to a raft that is linked to the print head), onto which dummy/sacrificial fused region other fused regions are fused, and at the end of the fabrication process, the sacrificial region is removed from the finished part, much like removing excess plastic material (from a sprue) from a model kit part.

Embodiment 13

The additive manufacturing system of any one of Embodiments 1-12, further comprising a raft engaged with the print head, the raft being configured for attachment to the fused region.

Embodiment 14

The additive manufacturing system of Embodiment 13, wherein the raft comprises a degradable material. As an example, if a finished part is attached to a raft made of degradable material, the raft can be degraded, leaving behind the finished part. Thus, one can use a raft that is selectively degradable, relative to the finished part that is attached to the raft.

Embodiment 15

The additive manufacturing system of any one of Embodiments 1-14, further comprising at least one optical system configured to image at least a portion of the fused region. An optical system can be, e.g., a camera (still or video).

Embodiment 16

The additive manufacturing system of any one of Embodiments 1-15, wherein the first illumination train comprises a laser. A variety of lasers can be used; blue laser light is considered especially suitable.

Embodiment 17

The additive manufacturing system of any one of Embodiments 1-16, further comprising a resin support substrate having a first surface, the first surface being configured to support an amount of curable resin thereon. A resin support substrate can be, e.g., a plate, stage, vessel, and the like.

Embodiment 18

The additive manufacturing system of Embodiment 17, wherein the resin support substrate is configured to receive a fused region of particulate material such that the fused region contacts the amount of curable resin.

Embodiment 19

The additive manufacturing system of any one of Embodiments 17-18, further comprising an illumination train configured to cure curable resin supported by the first surface of the resin support substrate, the illumination train optionally projecting illumination that passes through the resin support substrate so as to cure curable resin supported by the first surface of the resin support substrate.

Embodiment 20

The additive manufacturing system of Embodiment 19, wherein the illumination train is configured to cure curable resin disposed within the fused region of particulate material.

Embodiment 21

The additive manufacturing system of Embodiment 19, wherein the illumination train is configured to cure curable resin disposed exterior to the fused region of particulate material.

Embodiment 22

A method, comprising: disposing a first amount of particulate material such that the particulate material is supported by a first side of a first support substrate, the first side of the first support substrate further comprising a release agent disposed thereon, optionally disposing an amount of a release agent onto the first side of the first support substrate or optionally disposing an amount of a release agent onto the first amount of particulate material, the first support substrate being at least partially transparent to an illumination; projecting an illumination at a second side of the first support substrate such that the illumination effects formation in the first amount of particulate material of a first fused region comprising at least some of the first amount of the particulate material, the illumination optionally being provided in a preprogrammed pattern; and effecting motion of the first fused region of the first particulate material so as to give rise to a distance between the first fused region and the first side of the first support substrate.

As mentioned, illumination can be projected in a preprogrammed pattern, e.g., a circle or a spiral. Illumination can also be projected through a mask and/or filter that allows illumination passage in a desired shape, e.g., a mask with a triangular cutout would allow for formation of a triangular-shaped fused region.

Embodiment 23

The method of Embodiment 22, further comprising disposing a second amount of particulate material such that the second amount of particulate material is supported by the first side of the first support substrate.

Embodiment 24

The method of Embodiment 18, wherein the second amount of particulate material comprises particulate material that differs in particulate size, particulate composition, or both from the first amount of particulate material.

Embodiment 25

The method of any one of Embodiments 22-24, further comprising projecting an illumination at the second side of the first support substrate such that the illumination exits the first side of the first support substrate and the illumination effects formation in the second amount of particulate material of a second fused region comprising at least some of the first amount of the particulate material.

Embodiment 26

The method of Embodiment 23, further comprising effecting, with an illumination, fusion between the first fused region and the second fused region.

Embodiment 27

The method of Embodiment 20, further comprising placing the first fused region into register with a second substrate, the second substrate being at least partially transparent to an illumination.

Embodiment 28

The method of Embodiment 22, further comprising supporting a second amount of particulate material with a first side of the second support substrate, the first side of the second support substrate optionally comprising a release agent disposed thereon, optionally disposing an amount of a release agent onto the first side of the second support substrate or optionally disposing an amount of a release agent onto the second amount of particulate material; projecting an illumination at a second side of the second support substrate such that the illumination effects formation in the second amount of particulate material of a second fused region comprising at least some of the second amount of the particulate material, the illumination optionally being provided in a preprogrammed pattern; and optionally effecting motion of the second fused region of the second particulate material so as to give rise to a distance between the second fused region and the first side of the second support substrate.

Embodiment 29

The method of Embodiment 28, wherein the second amount of particulate material comprises particulate material that differs in particulate size, particulate composition, or both from the first amount of particulate material.

Embodiment 30

The method of any one of Embodiments 26-27, further comprising effecting fusion between the first fused region and the second fused region, the fusion optionally being effected by illumination.

Embodiment 31

The method of Embodiment 20, further comprising contacting the fused region to a curable resin.

Embodiment 32

The method of Embodiment 29, wherein the contacting is performed such that the curable resin infiltrates the fused region.

Embodiment 33

The method of Embodiment 29, wherein the contacting is performed such that the curable resin is disposed on the fused region.

Embodiment 34

The method of Embodiment 31, wherein the curable resin does not infiltrate the fused region.

Embodiment 35

The method of any one of Embodiments 31-34, further comprising curing the curable resin. As shown in the attached figures, curable resin can be cured about a fused region, e.g., such that the fused region is enclosed within a casing or other form of cured resin.

Embodiment 36

A part comprising a fused region made according to any one of Embodiments 22-35. Exemplary parts include, e.g., automotive parts, medical instruments, foodstuffs, dosage forms, and the like.

Embodiment 37

A system configured to perform the method according to any one of Embodiments 22-35.

Embodiment 38

A method, comprising: projecting an illumination through a first substrate that is at least partially transparent to the illumination so as to give rise to a first fused region of a first particulate material supported by the substrate, a release agent optionally being disposed on the first substrate so as to reduce adhesion between the first substrate and the fused region of the first particulate material, the projecting optionally being performed so as to provide the illumination in a preprogrammed pattern; and projecting an illumination through a second substrate that is at least partially transparent to the illumination so as to give rise to a second fused region of a second particulate material supported by the second substrate, the second substrate optionally being the first substrate, a release agent optionally being disposed on the second substrate so as to reduce adhesion between the substrate and the fused region of the first particulate material, the projecting optionally being performed so as to provide the illumination in a preprogrammed pattern; and effecting fusion, by illumination, between the first fused region and the second fused region.

As explained elsewhere herein, the first substrate and the second substrate can be the same substrate. As an example, a first fused region can be formed of a material supported by a first substrate. A second fused region can then be formed of a second particulate material that is supported by that same first substrate. The first fused region and the second fused region can be fused together.

Embodiment 39

The method of Embodiment 38, wherein the illumination is provided by a laser.

Embodiment 40

The method of any one of Embodiments 38-39, wherein the second of particulate material comprises particulate material that differs in particulate size, particulate composition, or both from the first particulate material.

Embodiment 41

A multimaterial part, comprising: at least one multimaterial layer, the at least one multimaterial layer comprising (i) a first region formed of a first fused particulate material and (ii) a second region formed of a second fused particulate material, the first particulate material differing in size, particulate composition, or both from the first second particulate material, and the first and second regions being fused to one another.

Embodiment 42

A method, comprising: projecting an illumination through a substrate that is at least partially transparent to the illumination so as to give rise to a first fused region of a first particulate material supported by the substrate, a release agent optionally being disposed on the substrate so as to reduce adhesion between the substrate and the fused region of the first particulate material, the projecting optionally being performed so as to provide the illumination in a preprogrammed pattern; and projecting an illumination through the substrate so as to give rise to a second fused region of a second particulate material supported by the substrate, a release agent optionally being disposed on the substrate so as to reduce adhesion between the substrate and the fused region of the second particulate material, the projecting optionally being performed so as to provide the illumination in a preprogrammed pattern; and effecting fusion, by illumination, between the first fused region and the second fused region.

It should thus be understood that formation of multiple fused regions of particulate material can be effected on different substrates on or the same substrate. As an example, a part can be constructed of multiple fused regions (e.g., layers), wherein each of the layers is formed (i.e., fused) from particulate material that was supported by the same substrate. FIGS. 13A-13F provide an example of this. As another example, a part can be constructed of multiple fused regions, wherein different fused regions were formed on different substrates. FIG. 1 provides an example of this, showing that fused regions can be formed on first support substrate 116 and also on second support substrate 116a, whereby moveable print tray 102 and the object being printed (104) can be moved from the first support substrate 116 and the second support substrate 116a.

The foregoing disclosure is exemplary only and should not be understood to limit the scope of the present disclosure or the appended claims.

What is claimed:

1. An additive manufacturing system, comprising:
   a first support substrate having a first side and a second side,
      the first support substrate being at least partially transparent to an illumination, and
      the first side of the first support substrate being configured to support a particulate material such that the particulate material is exposed to the illumination;
   a first illumination train configured to project the illumination toward the second side of the first support substrate such that the illumination passes through the first support substrate so as to illuminate the particulate material,
      the first illumination train optionally being configured to project the illumination in accordance with a preprogrammed pattern;
   a print head, the print head being configured to translate a fused region formed from particulate material supported by the first side of the first support substrate in a direction away from the first side of the first support substrate; and
(a) a first particulate dispensing train configured to dispense a first particulate material such that the first particulate material is supported by the first side of the first support substrate, (b) a first release agent dispensing train configured to dispense a release agent onto the first side of the first support substrate, or both (a) and (b).

2. The additive manufacturing system of claim 1, wherein the direction is parallel to and against gravity.

3. The additive manufacturing system of claim 1, further comprising a second particulate dispensing train configured to dispense a second particulate material such that the second particulate material is supported by the first side of the first support substrate.

4. The additive manufacturing system of claim 1, further comprising:
a second support substrate defining a first side and a second side,
the second support substrate being at least partially transparent to an illumination, and
the first side of the second support substrate being configured to support a particulate material such that the particulate material is exposed to the illumination.

5. The additive manufacturing system of claim 4, further comprising (a) a second particulate dispensing train configured to dispense a second particulate material such that the second particulate material is supported by the first side of the second support substrate, (b) a second release agent dispensing train configured to dispense a release agent onto the first side of the second support substrate, or both (a) and (b).

6. The additive manufacturing system of claim 1, wherein the first illumination train comprises a laser.

7. An additive manufacturing system comprising:
a first support substrate having a first side and a second side,
the first support substrate being at least partially transparent to an illumination, and
the first side of the first support substrate being configured to support a particulate material such that the particulate material is exposed to the illumination;
a first illumination train configured to project the illumination toward the second side of the first support substrate such that the illumination passes through the first support substrate so as to illuminate the particulate material,
the first illumination train optionally being configured to project the illumination in accordance with a preprogrammed pattern;
a print head,
the print head being configured to translate a fused region formed from particulate material supported by the first side of the first support substrate in a direction away from the first side of the first support substrate;
a resin support substrate having a first surface, the first surface being configured to support an amount of curable resin thereon; and
an illumination train configured to cure curable resin supported by the first surface of the resin support substrate, the illumination train optionally projecting illumination that passes through the resin support substrate so as to cure curable resin supported by the first surface of the resin support substrate.

8. The additive manufacturing system of claim 7, wherein the resin support substrate is configured to receive a fused region of particulate material such that the fused region contacts the amount of curable resin.

9. The additive manufacturing system of claim 7, wherein the illumination train is configured to (a) cure curable resin disposed within the fused region of particulate material, (b) cure curable resin disposed exterior to the fused region of particulate material, or both (a) and (b).

* * * * *